United States Patent
Shah et al.

(12)

(10) Patent No.: US 12,189,645 B2
(45) Date of Patent: Jan. 7, 2025

(54) METHODS AND SYSTEMS FOR GENERATING RECOMMENDATIONS IN CLOUD-BASED DATA WAREHOUSING SYSTEM

(71) Applicant: Capital One Services, LLC, McLean, VA (US)

(72) Inventors: Hiren Shah, Stafford, CA (US); Ganesh Bharathan, Henrico, VA (US); Sridhar Maramreddy, Glen Allen, VA (US); Naga Venkata Sriram Vadakattu, Frisco, TX (US); Naveen Kumar Kilaru, Little Elm, TX (US); Nicole Ann Luo, Frisco, TX (US); David Ellis, San Diego, CA (US); Felix Li, Pittsburgh, PA (US); Yudhish Batra, Glen Allen, VA (US); Kishore Kolanu, Glen Allen, VA (US); Fnu Syed Siraj Mehmood, Aldie, VA (US)

(73) Assignee: Capital One Services, LLC, McLean, VA (US)

( * ) Notice: Subject to any disclaimer, the term of this patent is extended or adjusted under 35 U.S.C. 154(b) by 122 days.

(21) Appl. No.: 17/964,215

(22) Filed: Oct. 12, 2022

(65) Prior Publication Data

US 2023/0409590 A1 Dec. 21, 2023

Related U.S. Application Data

(60) Provisional application No. 63/351,325, filed on Jun. 10, 2022.

(51) Int. Cl.
*G06F 16/25* (2019.01)

(52) U.S. Cl.
CPC .................. *G06F 16/252* (2019.01)

(58) Field of Classification Search
CPC ................ G06F 16/252; G06F 16/254
See application file for complete search history.

(56) References Cited

U.S. PATENT DOCUMENTS

| | | | |
|---|---|---|---|
| 11,436,145 B1* | 9/2022 | Narigapalli | G06N 20/20 |
| 2012/0054331 A1* | 3/2012 | Dagan | G06F 11/301 |
| | | | 709/224 |

(Continued)

FOREIGN PATENT DOCUMENTS

CN 110262945 A 9/2019

OTHER PUBLICATIONS

Sep. 29, 2023≤(WO) Partial Search Result and Provisional Opinion—App No. PCT/US2023/024812.

(Continued)

*Primary Examiner* — Irete F Ehichioya
*Assistant Examiner* — Xiaoqin Hu
(74) *Attorney, Agent, or Firm* — Banner & Witcoff, Ltd.

(57) ABSTRACT

Methods, systems, devices, and computer-readable media used by a cloud data management system for collecting data from accounts hosted by a cloud-based data warehousing system on different cloud platforms or in different cloud regions of a cloud platform. Collection of data in the multi-cloud platform and/or multi-cloud region environments may be facilitated by the on-demand creation of one or more data collection accounts. Based on the collected data, one or more recommendations, notifications, or alerts associated with usage of the data warehousing system may be generated.

20 Claims, 27 Drawing Sheets

(56) References Cited

U.S. PATENT DOCUMENTS

| | | | |
|---|---|---|---|
| 2013/0311430 A1* | 11/2013 | Izawa | G06F 16/174 |
| | | | 707/640 |
| 2016/0283304 A1* | 9/2016 | Horikawa | G06F 11/3452 |
| 2017/0251013 A1 | 8/2017 | Kirti et al. | |
| 2020/0301938 A1 | 9/2020 | Gale et al. | |
| 2020/0349156 A1 | 11/2020 | Frantz et al. | |
| 2021/0004382 A1* | 1/2021 | Nautiyal | G06F 9/45558 |
| 2021/0320968 A1 | 10/2021 | Chu et al. | |
| 2022/0014421 A1 | 1/2022 | Medam et al. | |
| 2022/0021652 A1 | 1/2022 | Moghe et al. | |
| 2022/0050855 A1 | 2/2022 | Chu et al. | |
| 2022/0342933 A1 | 10/2022 | Lydick et al. | |
| 2022/0350922 A1* | 11/2022 | Blum | G06F 16/245 |

OTHER PUBLICATIONS

Nataliya Boyko et al., "Prospects for Using Cloud Data Warehouses in Information Systems" IEEE Xplore, 2018, pp. 136-139.

* cited by examiner

FIG. 3B

Client A: Unmanaged Warehouse Resources

| OBJECT NAME | ACCOUNT | SIZE | CLUSTERS | CREATED ON | | |
|---|---|---|---|---|---|---|
| ☐ ACCTG_BATCH_WH | Accounting_1 | Medium | Min: 1 Max: 3 | 11/29/2001 | (in progress) | Cancel |
| ☐ ACCTG_ANALYST_WH | Accounting_1 | Large | Min: 1 Max: 4 | 11/29/2001 | (in progress) | Cancel |
| ☐ ACCTG_CALC_WH | Corp_East | Small | Min: 1 Max: 2 | 11/29/2001 | (in progress) | Cancel |
| ☐ ACCTG_CORP_ANALYST_WH | Corp_West | Large | Min: 1 Max: 4 | 11/28/2001 | | Details |
| ☐ ACCTG_PAY_WH | Payroll | Large | Min: 1 Max: 4 | 11/27/2001 | | Details |
| ☐ ACCTG_HR_WH | Human_Resource | Small | Min: 1 Max: 2 | 11/20/2001 | | Details |
| ☐ ACCTG_ANALYST2_WH | Accounting_2_East | Medium | Min: 1 Max: 3 | 11/9/2001 | | Details |
| ☐ ACCTG_BATCH2_WH | Accounting_2_West | Large | Min: 1 Max: 4 | 12/1/2001 | | Details |

1 of N pages

FIG. 9C

METHODS AND SYSTEMS FOR GENERATING RECOMMENDATIONS IN CLOUD-BASED DATA WAREHOUSING SYSTEM

CROSS-REFERENCE TO RELATED APPLICATIONS

This application claims priority to and the benefit of U.S. Provisional Patent Application No. 63/351,325, filed Jun. 10, 2022, and entitled "Cloud-Data Management Across Cloud Regions and Cloud Platforms of Cloud-Based Data Warehousing System," the content of which is incorporated herein, by reference, in its entirety. This application is related to U.S. patent application Ser. No. 17/838,117, filed Jun. 10, 2022, and entitled "Methods of Data Sharing Across Cloud Regions and Platforms of Cloud-Based Data Warehousing Systems," and to U.S. patent application Ser. No. 17/838,133, filed Jun. 10, 2022, and entitled "Methods of Orchestrated Data Sharing Across Cloud Regions and Platforms of Cloud-Based Data Warehousing Systems."

FIELD OF USE

Aspects of the disclosure relate generally to cloud data management. More specifically, aspects of the disclosure relate to methods and systems for cloud data management across accounts that are hosted on different cloud platforms or different cloud regions of a cloud-based data warehousing system.

BACKGROUND

Many organizations rely on data warehousing systems to serve as a central repository for integrating and managing data collected from disparate systems or sources internal or external to their organizations. Such data warehousing systems are often used to support reporting, data analysis, and other business intelligence functions and, thus, are generally optimized for such purposes. With the ever-increasing amounts of data and the complexity involved in managing and securing such data, organizations are relying on data warehouse systems provided as a managed service on a public cloud platform (e.g., AMAZON WEB SERVICES cloud platform by Amazon Web Services, Inc. of Seattle, Washington, MICROSOFT AZURE cloud platform by Microsoft, Corporation of Redmond, Washington, GOOGLE CLOUD PLATFORM provided by Google LLC of Menlo Park, California, and/or similar public cloud platforms) to meet their business and data needs. These cloud-based data warehousing systems, sometimes referred to as data warehouse-as-a-service systems, may provide several benefits to organizations over on-premises data warehousing systems due to the ease and speed in which such systems may be stood up by the organization, the systems' ability to be integrated with other business systems of the organization, the limited degree of maintenance required by the organization, the ability to readily scale resources provided by the systems to support the organization's current business and data needs, and the various additional services provided by such systems, to name a few.

Further, the use of such data warehouse-as-a-service systems may allow organizations to offload, to the data warehouse-as-a-service provider, complex and expensive data warehousing and query operations, which may otherwise cause computing resource challenges for the organization's on-premises resources. For example, a user of the organization seeking to query a multi-terabyte data warehouse, rather than trying to execute the query and collect results on their laptop, may send, to a cloud-based data warehouse hosted by a service provider, instructions that cause one or more servers associated with the cloud-based data warehouse to perform the query. This may allow the results of the query to be accessed from a relatively underpowered computing device, such as via a user interface on the user's laptop. This may lower the processing burden on individual users' computers when performing queries, lower the network bandwidth required for such queries (since data need not be downloaded to the user's computer), and in many cases, significantly speed up the overall query process.

Moreover, some data warehouse-as-a-service systems, such as SNOWFLAKE, developed by Snowflake, Inc. of Bozeman, Montana, may make use of virtual data warehouses. For instance, one or more servers may be used by such systems to instantiate virtual data warehouses for use in performing database queries. SNOWFLAKE, for example, provides features that allow for improvements over conventional data warehouse systems by enabling virtual data warehouses to be created, modified, and destroyed on demand. This may allow multiple database queries to be executed against the data warehouse simultaneously, but separately, and further allows the appropriate resources to be allocated to each such query session. To preserve computing resources, an organization might configure and use multiple virtual data warehouses of different sizes—e.g., configured with varying amounts of computing resources. This might allow for larger, more significant, and/or time-sensitive queries to be executed against a first virtual data warehouse created and configured with an appropriate amount of computing resources to support such queries, while a second virtual data warehouse might be created and configured with a lesser degree of computing resources to support relatively smaller, less significant, and/or less time-sensitive queries.

The costs associated with such data warehouse-as-a-service systems may quickly add up as multiple users across departments or business units of the organization stand up their own data warehouses and utilize warehouse resources. For instance, an organization may have multiple accounts (e.g., one or more for each of its departments and/or business units) with a data warehouse-as-a-service provider, and each such account may have its own set of data warehousing resources, such as users, databases, and even data warehouses. Tracking and managing usage and costs may be a crucial part of maintaining such services, but may present particular technical challenges when an organization's accounts are spread across different cloud regions and/or different cloud platforms. For instance, due to the ease in setting up such virtual data warehouses in an on-demand manner, coupled with the ability for the data warehouses to be spread across different cloud regions and/or different cloud platforms, the organization might not be aware of all of the data warehousing resources that are associated with the organization or might not have a consolidated and real-time view of all of the resources being provided to the organization by the service provider. This may make it difficult to collect data associated with the different data warehousing resources and, in turn, to manage and control usage and costs across the organization. Further, when an organization's data warehousing resources are spread across different cloud regions and/or different cloud platforms, there may be particular technical challenges when accounts associated with other, non-related organizations need to access data associated with such data warehousing resources.

Aspects described herein may address these and other problems, and may generally improve the ability for data hosted by a data warehouse-as-a-service system to be shared between different cloud platforms and cloud regions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Aspects described herein relate to systems, apparatus, computer-readable media, and methods for facilitating the management of data warehouses within a cloud-based data warehousing system, such as provided by a data warehouse-as-a-service provider. Aspects described herein may enable the sharing of data between accounts within the cloud-based data warehousing system that are hosted by the service provider on different cloud platforms or in different cloud regions of a particular cloud platform, and where such accounts may be associated with different organizations. A native sharing protocol of the cloud-based data warehousing system may prohibit data sharing, within the data warehousing system, between accounts that are hosted on different cloud platforms or within different cloud regions of the same cloud platform. The native sharing protocol of the data warehousing system may further prohibit data replication, within the data warehousing system, between accounts associated with cloud-based data warehouses when those accounts are associated with different organizations.

Aspects described herein may overcome these technical challenges by the on-demand creation of one or more data collection accounts, which may be used to facilitate the sharing and replication of data in multi-cloud platform/region environments. For instance, a first computing device associated with a first data manager account, of a cloud-based data warehouse system, may receive a request to access data associated with a client account of the cloud-based data warehouse system. Based on determining that the client account is hosted in a different cloud region than a cloud region that the data manager account is hosted in: instructions may be sent, to a computing device associated with the client account, to instruct the client account to share its data with a second data manager account that is hosted in the same region as the client account. Additional instructions may be sent, to a computing device associated with the second data manager account, to instruct the second data manager account to persist the data shared with the second data manager account and to replicate that data to the first data manager account. After the shared data has been replicated to the first manager account, an indication of the replication may be received and the shared data may be stored in storage associated with the first data manager account.

The stored shared data may be used to generate recommendations for the client account or to identify any unmanaged warehouse resources associated with the client account. For instance, configuration information associated with a plurality of different recommendation algorithms associated with the client account may be retrieved, and based on the configuration information a first recommendation algorithm may be determined. The stored shared data associated with the client account may be provided as input to the first recommendation algorithm and the first recommendation algorithm may be executed. The first recommendation algorithm may output a recommendation, alert, notification, or other type of insight associated with at least one data warehouse resource associated with the client account. Alternatively or additionally, the stored shared data may be analyzed to determine whether any new warehouse resources may be included in the data since a previous request to access the data occurred. A listing of any new warehouse resources identified in the stored shared data may be output. In response to a selection of one of the new warehouse resources from the listing, and based on the type of the selected warehouse resource, a set of operating parameters may be generated to be associated with that warehouse resource. The selected warehouse resource may then be configured to utilize the set of generated operating parameters during operation of the selected warehouse resource.

These features, along with others, are discussed in greater detail below.

BRIEF DESCRIPTION OF THE DRAWINGS

The present disclosure is described by way of example and not limited in the accompanying figures in which like reference numerals indicate similar elements and in which:

FIG. 3B shows an illustrative user interface displaying a consolidated view of data warehouse resources, in accordance with one or more aspects described herein.

FIG. 9C shows an illustrative user interface displaying a listing of unmanaged resources, in accordance with one or more aspects described herein.

DETAILED DESCRIPTION

Figure 1:
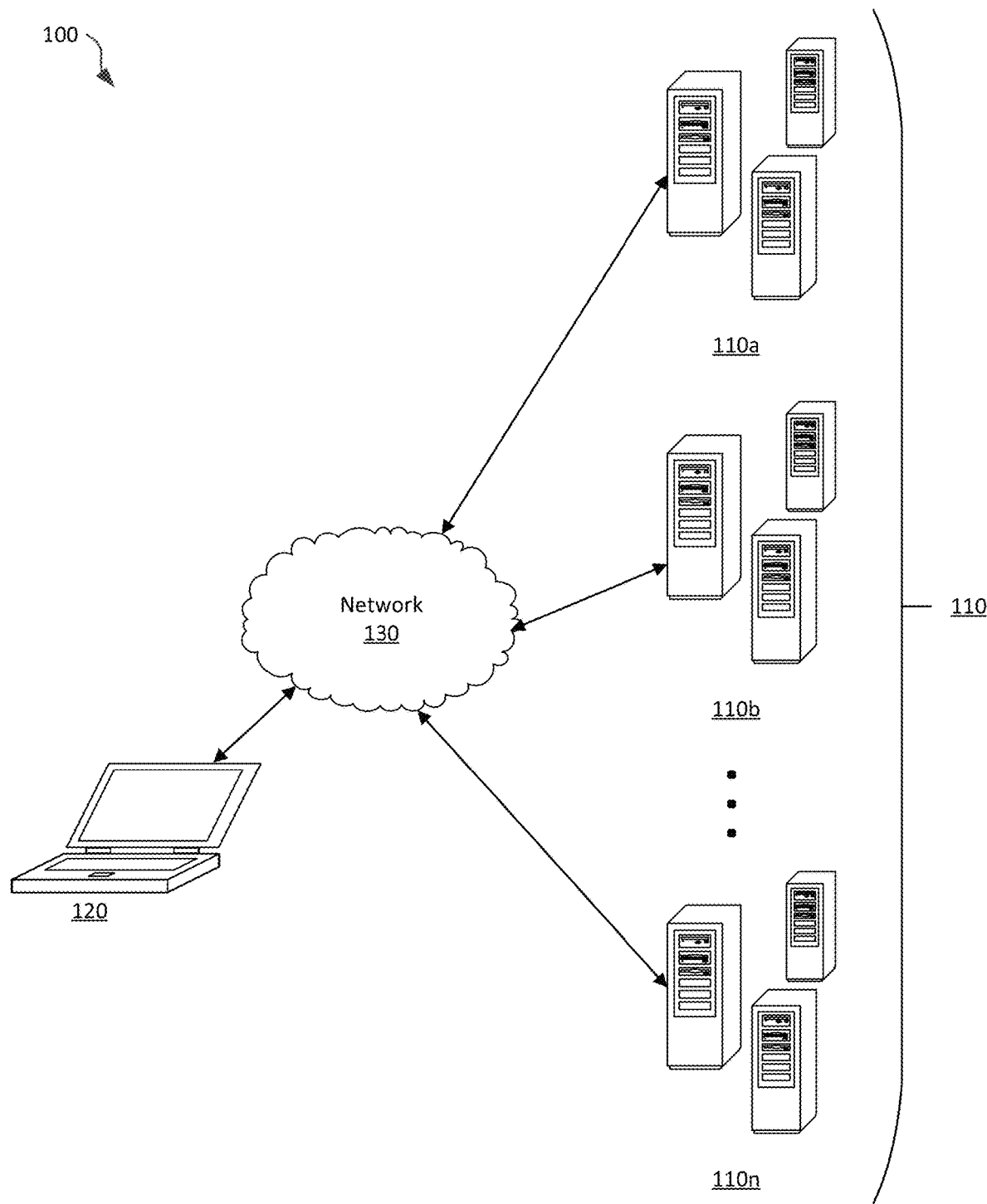
FIG. 1 shows an exemplary computing environment, in accordance with one or more aspects described herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may generally relate to methods and techniques for sharing data between accounts hosted by a data warehouse-as-a-service system. A service provider, such as SNOWFLAKE, may provide data warehousing services that run on a public cloud platform (e.g., AMAZON WEB SERVICES, MICROSOFT AZURE, GOOGLE CLOUD PLATFORM, and/or similar public cloud platforms). The service provider may provide its cloud-based data warehousing services to multiple organizations, and each organization may have multiple accounts with the service provider. The organizations may select which cloud platforms to have their data warehouse accounts hosted on. For instance, an organization may already use AMAZON WEB SERVICES for other of its cloud services and, thus, may choose to have their data warehousing accounts hosted there as well. The organization may further select one or more particular cloud regions of the cloud platform on which their accounts should be hosted. The cloud region may refer to the geographical location or region of the world in which one or more of the cloud platform's data centers are located. That is, the cloud platform may have data centers in multiple geographical locations or regions of the world and the organization may choose which cloud region or regions to host its accounts on the data warehousing system. Such decisions may be based on a need to comply with data residency regulations and laws, a desire to have the data located proximate to the end users or a significant amount of the traffic, costs considerations, or the like. Organizations may, at times, choose to host multiple accounts across more than one cloud region, or even more than one cloud platform, to support multiple business units/functions or departments; as a means of replicating the data to decrease latency; for redundancy to serve as a fallback if one cloud region goes down, etc.; or for some other business purpose. Accordingly, any given organization may have multiple accounts spread across different cloud platforms and/or different cloud regions of a cloud-based data warehousing system.

In some cases, organizations may have relationships with one another and may need to share data across their respective accounts of the cloud-based data warehousing system. For instance, a first organization may have a relationship with one or more other organizations that regularly access the first organization's data stored in its cloud-based data warehouse and/or for whom the first organization may provide cloud data management services to assist the other organization in the management of their data warehouse resources in the cloud-based data warehousing system, such as by assisting the clients in managing their costs and usage associated with consumption of the data warehouse resources. The first organization may be a cloud data management organization, and the one or more other organizations may be viewed as clients of the cloud data management. The cloud data management organization may provide its service to the clients for a cost. The clients may access the cloud data management organization's data for use in their own businesses, for example, to perform analytics or the like. Additionally or alternatively, the cloud data management organization may provide services to the clients that may enable the clients to access a single and centralized view of the various resources being utilized by the clients in the cloud-based data warehousing system, and that analyze data associated with the various resources in order to develop and provide to the clients insights, recommendations, alerts, notifications and/or the like, related to usage and/or costs associated with the resources. Accordingly, to provide such services the cloud data management organization may need to gather data over time from its clients. In the case where the cloud data management organization and its clients maintain accounts on the same cloud platform and cloud region of the cloud-based data warehousing system, such a task may be a straightforward process, since most cloud-based data warehousing systems permit data to be shared or exchanged between accounts of the data warehousing system when those accounts are hosted on the same cloud platform and cloud region. However, when such accounts are spread across different cloud platforms and different cloud regions, albeit using the same cloud-based data warehousing system, technical challenges may arise.

Typically, such cloud-based data warehousing systems, such as SNOWFLAKE, enable data (e.g., database objects associated with databases of the account's data warehouse) to be shared between accounts. In SNOWFLAKE, for example, sharing may involve a first account providing, to one or more other accounts, permission to access select database objects in the first account's data warehouse. In SNOWFLAKE, such sharing is accomplished without copying or transferring any actual data between accounts. Instead, SNOWFLAKE may enable the sharing through the use of metadata. The sharing (or source) account may create a new version (sometimes referred to as a share) of one or more databases in their account and may grant permission to other accounts to access specific database objects within the database(s). The share may identify the privileges that grant access to the shared databases(s) and database objects, the schema for each of those database objects, and the accounts with which the database(s) and database objects are being shared. The one or more accounts with which the sharing account has shared data may access (e.g., consume) the share in their own account(s). Accessing (e.g., consuming) the share may involve the creation, in the consuming (or target) account(s), of a read-only database created from the share. In this way, all shared database objects may be accessible directly from the consuming account as if the account user were accessing his own database objects. As such, different organizations may easily share data across their respective accounts. For instance, a first organization may share data from one of its accounts with an account associated with a second organization. However, in some cloud-based data warehousing systems, such as SNOWFLAKE, the native sharing features prohibit data from being shared between accounts that are hosted on different cloud platforms or within different cloud regions of the cloud platform. This may then create issues when accounts need to share data hosted on different cloud platforms or regions of the cloud-based data warehousing system.

Conventionally, to work around this limitation, a first account wishing to share its data with a second account on a different cloud platform or region may make a physical copy of the data and provide the physical copy to the second account. In SNOWFLAKE, this may be accomplished by replication of the first account's data to the second account. For instance, the first (or source) account that wishes to share its data with the second (or target) account, hosted on a cloud platform or in a cloud region different from the source account, may cause its database or one or more database objects to be replicated (e.g., copied) to the target account. Replicating the source account's database or database objects may involve the creation of a replica of the database or database objects in the target account—and this, in turn, may cause a snapshot of various database objects and data to be transferred to the replica database in the target account. However, in some cloud-based data warehousing systems, such as SNOWFLAKE, native sharing features may prohibit the replication of (e.g., the copying of) shared data, as well as the replication of data across accounts belonging to different organizations. Therefore, in such a system, if a first account from Organization A wishes to share data, within the cloud-based data warehousing system, with a second account from Organization B, and the first and second accounts are hosted by the cloud-based data warehousing system on different cloud platforms or in different cloud regions, it might not be possible to share such data using the existing technical capabilities and native features of the cloud-based data warehousing system. Instead, the first account's data may need to be downloaded and transmitted, such as via file transfer protocol (FTP), to a computing device associated with Organization B, and an administrator at Organization B may need to upload the data back into to the cloud-based data warehousing system and into a data warehouse associated with the second account. This may be time-consuming, be prone to human error, use significant computing resources, and present security issues.

Accordingly, an improved method and system for sharing data between accounts, within a cloud-based data warehousing system, is disclosed herein. The disclosed system improves the functioning of computers by providing a mechanism for efficiently and securely sharing and/or moving data within a cloud-based data warehousing system, while minimizing processing times and the use of significant computing resources. This system also advantageously avoids the manual effort and computational waste of, for example, the FTP-based approach discussed above. The disclosed system could not be performed in the human mind or using pen-and-paper, at least, because the disclosed system is fundamentally rooted in computing technology and, in particular, in the sharing and transmission of data within a cloud-based data warehousing system. While various business-related functions may be referred to in the discussion of the disclosed system, those references are merely provided to give the reader a clear understanding of the practical manner in which the technology described herein might be used. The disclosed features provide a technical solution to a technical challenge associated with limitations in the native data sharing and transmission functionality of certain cloud-based data warehousing systems.

Referring to FIG. 1, an exemplary computing environment 100 associated with a cloud-based data warehousing system is shown. The computing environment 100 may include one or more systems or computing devices, such as a cloud-based data warehousing system 110, one or more client devices 120, and a network 130.

The cloud-based data warehousing system 110 may be all or a portion of a data warehouse-as-a-service system provided by a service provider, such as SNOWFLAKE. The service provider may provide data warehousing services and/or resources, such as computing or storage resources, to one or more organizations, and such services and resources may be managed and operated by the service provider on behalf of the one or more organizations. The cloud-based data warehousing system 110 may comprise one or more computing devices, such as servers, which may store a plurality of data warehouses 110*a-n*. The data warehouses 110*a-n* may be managed and operated by the service provider on behalf of the one or more organizations. For instance, a data warehouse 110*a* may be managed and operated by the service provider on behalf of a first organization and a data warehouse 110*b* may be managed and operated by the service provider on behalf of a second, different organization. In some cases, more than one data warehouse 110*a-n* may be managed and operated on behalf of a single organization. The cloud-based data warehousing system 110, however, need not be a system provided by SNOWFLAKE, or other service provider system, and instead may be any type of data warehousing system implemented on cloud infrastructure.

Each of the data warehouses 110a-n may comprise one or more databases or other devices that store data. Each of the data warehouses 110a-n may be a single database or device, may be a collection of databases and/or devices. The data warehouse 110a-n may be structured and/or unstructured, such that, for example, a data warehouse may comprise a data lake. The data warehouses 110a-n may be or include, but need not be limited to, virtual data warehouses. The virtual data warehouse may be a set of logical views of one or more portions of one or more physical database objects, databases, or data warehouses. Such virtual data warehouses may be instantiated, resized, and/or destroyed on-demand. The virtual data warehouses may use varying amounts of computing resources—such as processing speed, storage, nodes and/or clusters, memory or the like. The data warehouses 110a-n may further be or include, but need not be limited to, relational databases, hierarchical databases, distributed databases, in-memory databases, flat file databases, XML databases, NoSQL databases, and/or graph databases. The data warehouses 110a-n may be a combination of any of the aforementioned databases and/or data warehouses. The data warehouses 110a-n may store data in a variety of formats and in a variety of manners. For example, a data warehouse may comprise textual data in a table, image data as stored in various file system folders, or any other type of data.

In some cases, the data warehouses 110a-n, although part of a single cloud-based data warehousing system 110, may be hosted on different cloud platforms, such as a public cloud platform (e.g., AMAZON WEB SERVICES, MICROSOFT AZURE, GOOGLE CLOUD PLATFORM, and/or similar public cloud platforms). In this case, the physical devices on which the data warehouses 110a-n are maintained may be devices owned and operated by the cloud platform provider (e.g., AMAZON, MICROSOFT, GOOGLE, or the like). For instance, the data warehouse 110a may be hosted on a first cloud platform, such as GOOGLE CLOUD PLATFORM, while the data warehouse 110b may be hosted on a second cloud platform, such as AMAZON WEB SERVICES. Further, the data warehouses 110a-n may be hosted on the same cloud platform, but within different regions of the cloud platform. The different regions may refer to different geographical locations or regions of the world in which a particular cloud platform has located one or more of its data centers and physical devices. For instance, the data warehouse 110b may be hosted in a first region of AMAZON WEB SERVICES, such as US East Region, while a data warehouse 110c, also hosted by AMAZON WEB SERVICEs, may be hosted in a second and different region, such as US West Region.

The data warehouses 110a-n may comprise one or more data warehouses 110a that are associated with an organization that provides additional cloud data management services (beyond those provided by the service provider, such as SNOWFLAKE) to organizations associated with other data warehouses 110b-n of the cloud-based data warehousing system 110. For instance, the cloud data management system for such an organization may provide services that may enable client organizations to discover cloud-based resources, such as data warehouses, data lakes, databases, tables, views, stored procedures, etc., being used by the client organization in one or more cloud-based systems, such as the cloud-based data warehousing system 110. The cloud data management system may provide to the client organization a single and centralized view of all such cloud resources being utilized by the client organization. The cloud data management system may discover such cloud-based resources even when those resources are hosted in different data cloud systems, on different cloud platforms or cloud regions, in different cloud data warehouses, or in different accounts associated with the client organization. The cloud data management system may collect and analyze data associated with the various cloud resources in order to provide alerts, insights, notifications, and/or recommendations related to the usage and/or costs associated with the resources. The cloud data management system may make recommendations regarding operating schedules, operating parameters, computing resources, scaling policies, or the like. The cloud data management system may further provide micro-services, such as libraries for common error handling, logging, and resiliency across the various cloud resources; and/or automate the provisioning of new cloud resources, such as new data warehouses in the cloud-based data warehousing system 110.

The one or more client devices 120 may be one or more devices associated with one or more organizations or end users of the one or more organizations. The one or more client devices 120 may be used to access resources, such as cloud-based services, provided by the cloud-based data warehousing system 110. The one or more client devices 120 may be configured to communicate with and/or connect to the cloud-based data warehousing system 110, via the network 130. The one or more client devices 120 may each comprise one or more applications for communicating with the cloud-based data warehousing system 110. For instance, the one or more client devices 120 may have installed thereon a web browser or other application, which may be used to send requests, such as database queries, to and/or receive data, such as query results, from one or more computing devices associated with the cloud-based data warehousing system 110. The web browser or application installed on the one or more client devices 120 may further be used to output a user interface, such as a dashboard, to display data associated with the cloud-based data warehousing system 110, such as centralized views of utilized data warehousing resources, resource allocation, performance, recommendations, notifications, alerts, insights, or the like, and/or to receive user requests associated with such data. The one or more client devices 120 may be any type of computing device or combination of devices capable of performing the particular functions disclosed herein. For example, the one or more client devices 120 may be and/or include servers, desktop computers, laptop computers, tablet computers, smart phones, fitness devices, or the like, which may include one or more processors, memories, communication interfaces, storage devices, and/or other components. The one or more client devices 120, in some instances, may be or include special-purpose computing devices configured to perform the functions disclosed herein.

The network 130 may connect one or more computing devices, such as the one or more client devices 120, to the cloud-based data warehousing system 110. The network 130 may include one or more of local area networks (LANs), wide area networks (WANs), virtual private networks (VPNs), the Internet, wireless telecommunication networks, and/or any other communication network or combination thereof. The existence of any of various network protocols such as TCP/IP, Ethernet, FTP, HTTP, and the like, and of various wireless communication technologies such as GSM, CDMA, WiFi, and LTE, may be presumed, and the various computing devices described herein may be configured to communicate, via the network 130, using any of these network protocols or technologies. It will be further appreciated that the network connections shown are illustrative and any means of establishing a communications link between the computers may be used.

Figure 2:
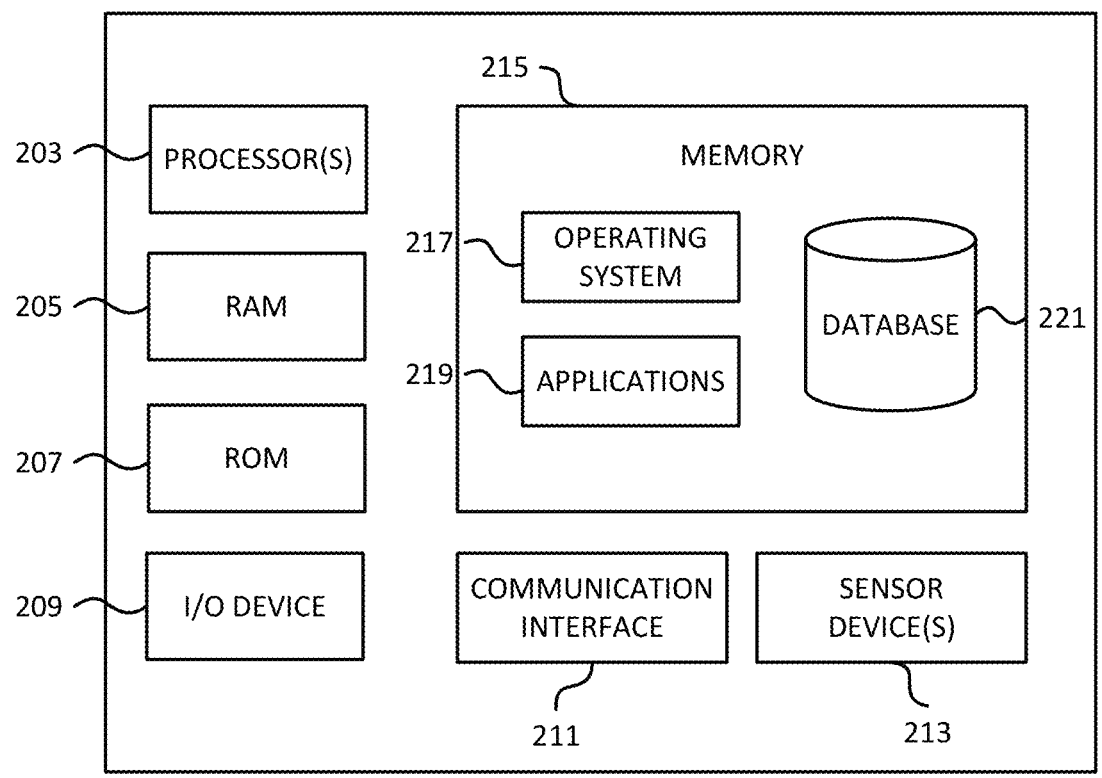
FIG. 2 shows an exemplary computing device, in accordance with one or more aspects described herein.

Referring to FIG. 2, an exemplary computing device 200, which may be used in accordance with one or more aspects described herein, is shown. The computing device 200 may include or incorporate any one of the devices of FIG. 1, such as one or more computing devices associated with the cloud-based data warehousing system 110 or the one or more client devices 120. The computing device 200 may represent, be incorporated in, and/or include various devices such as a desktop computer, a computer server, a mobile device, a laptop computer, a tablet computer, a smart phone, a fitness device, and/or any other type of data processing device.

The computing device 200 may include one or more components, such as one or more processors 203, a random-access memory (RAM) 205, a read-only memory (ROM) 207, an input/output (I/O) device 209, a communication interface 211, one or more sensor devices 213, and a memory 215. The computing device 200 may include one or more additional or different components.

The one or more processors 203 may be configured to control overall operation of the computing device 200 and its associated components. A data bus (not shown) may interconnect the one or more processors 203, the RAM 205, the ROM 207, the I/O device 209, the communication interface 211, the one or more sensor devices 211, and/or the memory 215. The one or more processors 203 may include a single central processing unit (CPU), which may be a single-core or multi-core processor, or may include multiple CPUs. The one or more processors 203 and associated components may control the computing device 200 to execute a series of computer-readable instructions to perform some or all of the processes disclosed herein. Although not shown in FIG. 2, various elements within the memory 215 or other components in the computing device 200, may include one or more caches, for example, CPU caches used by the one or more processors 203, page caches used by operating system 217, disk caches of a hard drive, and/or database caches used to cache content from database 221. For embodiments including a CPU cache, the CPU cache may be used by the one or more processors 203 to reduce memory latency and access time. The one or more processors 203 may retrieve data from or write data to the CPU cache rather than reading/writing to the memory 215, which may improve the speed of these operations. In some examples, a database cache may be created in which certain data from the database 221 may be cached in a separate smaller database in a memory separate from the database 221, such as in the RAM 205 or on a separate computing device. For instance, in a multi-tiered application, a database cache on an application server may reduce data retrieval and data manipulation time by not needing to communicate over a network with a back-end database server. These types of caches and others may be included in some cases, and may provide potential advantages in certain implementations of devices, systems, and methods described herein, such as faster response times and less dependence on network conditions when transmitting and receiving data.

The input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output.

The communication interface 211 may include one or more transceivers, digital signal processors, and/or additional circuitry and software for communicating via a network, wired or wireless, using any protocol as described herein.

The one or more sensor devices 213 may include one or more of an accelerometer, a gyroscope, a GPS device, a biometric sensor, a proximity sensor, an image capturing device, a magnetometer, etc.

The memory 215 may store software to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random-access memory (RAM) 205, read-only memory (ROM) 207, electronically erasable programmable read only memory (EE-PROM), flash memory or other memory technology, optical disk storage, magnetic cassettes, magnetic tape, magnetic disk storage or other magnetic storage devices, or any other medium that may be used to store the desired information and that may be accessed by processor 203.

Although various components of computing device 200 are described separately, functionality of the various components may be combined and/or performed by a single component and/or multiple computing devices in communication without departing from the scope of the disclosure.

The devices described in FIG. 1 and FIG. 2 may be used to perform all or portions of the aspects described below. A computing device may comprise one or more processors and memory storing instructions that, when executed by the one or more processors, cause performance of one or more steps. Additionally and/or alternatively, computer-readable media may store instructions that, when executed by one or more processors of a computing device, cause the performance of one or more steps described below. Additionally and/or alternatively, all or portions of the aspects described below may be implemented via microservices, such that, for example, one microservice may transmit instructions to another microservice.

Figure 3A:
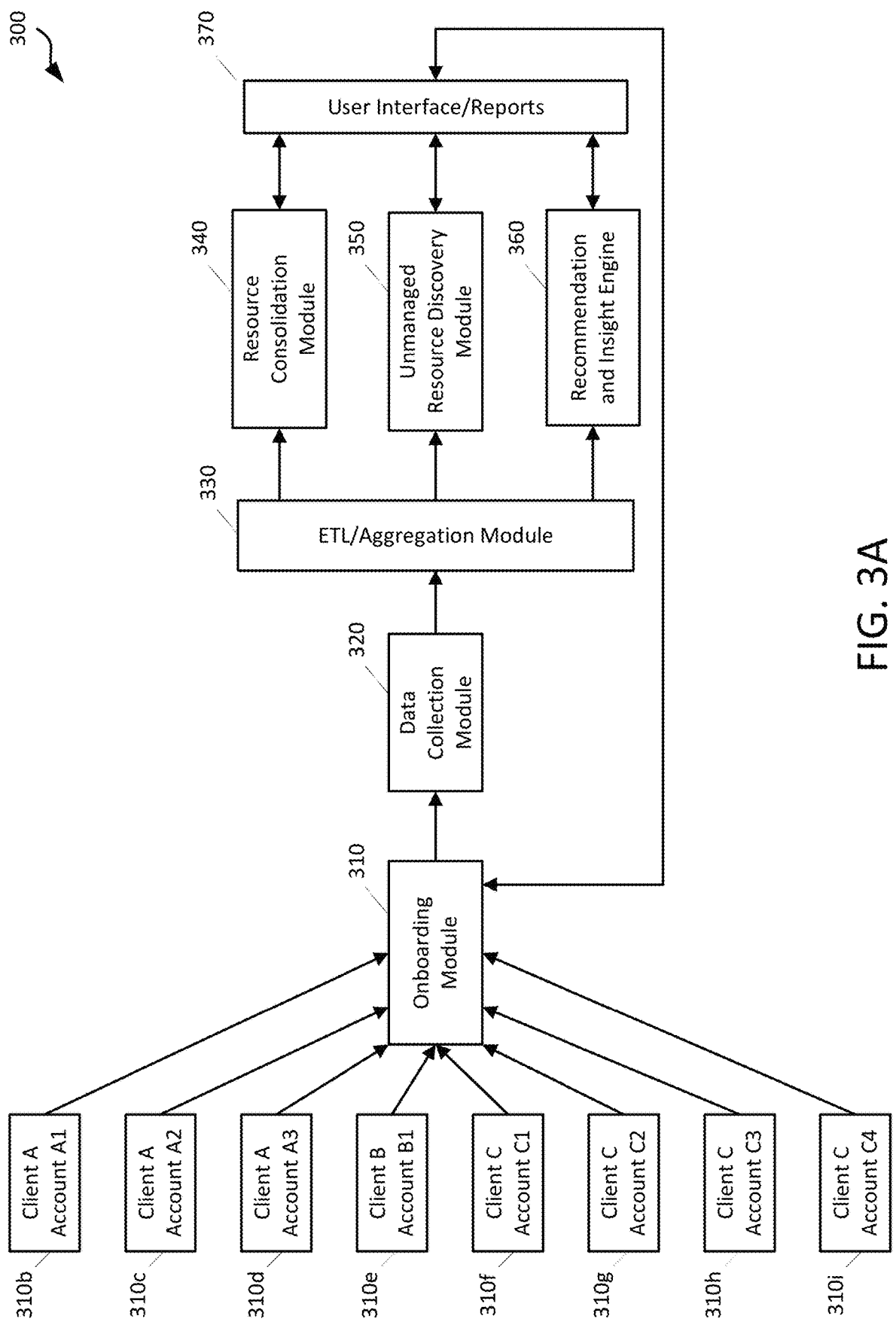
FIG. 3A shows an exemplary process by which a cloud data management system provides data management services in a cloud-based data warehousing system, in accordance with one or more aspects described herein.

FIG. 3A shows an exemplary process by which a cloud data management system 300 may provide data management services to one or more users (e.g., tenants) of the cloud-based data warehousing system 110. For simplicity of explanation, the data management services described herein are described with respect to a single cloud-based data warehousing system, however, these aspects need not be limited to a single cloud-based data warehousing system, and may instead span across multiple cloud-based data warehousing systems, and may further include any other cloud-based systems alone or in combination with cloud-based data warehousing systems. Further, some or all of the aspects described herein may be performed by one or more computing devices associated with the cloud data management system 300. For example, aspects described herein may be performed by a data manager computing device 301 associated with the cloud data management system 300. The data manager computing device 301 may be the computing device 200 shown in FIG. 2.

The users of the cloud-based data warehousing system 110 may, for example, be a plurality of different organizations, such as Organizations A, B, and C, and a data management service provider associated with the cloud data management system 300 may provide data management services to those organizations. In this way, the users/tenants, e.g., Organizations A, B, and C, may be clients (referred to as Clients A, B, and C in FIG. 3A) of the data management service provider and the data management service provider may assist Clients A, B, and C in managing and optimizing their usage of resources within the cloud-based data warehousing system 110 (and/or within other cloud-based systems). This may be necessary because the cloud-based data warehousing system 110 itself might not provide a means for an organization to view all of the various warehouse resources associated with the organization in a single central location—such as all of the data warehouses, databases, tables, views, etc. associated with the organization across various accounts or across various cloud regions or platforms—and further might not provide a holistic or centralized view of costs and usage associated with the organization's various warehouse resources. As another reason, this may be necessary in order to enable an organization to have a centralized view of cloud resources across different, unrelated cloud systems, such cloud data warehouses (e.g., SNOWFLAKE, REDSHIFT, BIG-QUERY), cloud data lakehouses (e.g. DATABRICKS), and the like. Accordingly, the cloud data management system 300 may provide its clients with services, such as centralized and consolidated views of the client's various warehouse resources, which may be associated with accounts spread across different cloud platforms or cloud regions; default or recommended schedules for resources such as warehouses; recommendations for adjustments to operating parameters associated with warehouse resources; and/or other recommendations, alerts, notifications, etc. associated with usage of the user's warehouse resources.

A user of the cloud-based data warehousing system 110 may onboard (e.g., by registering, linking, importing, etc.) one or more of their existing accounts and/or data warehouse resources to the cloud data management system 300. For example, the cloud data management system 300 may provide an onboarding module 310, via one or more executables, applications and/or user interfaces, such as user interface 370, to facilitate the onboarding of existing accounts and/or corresponding warehouse resources. The one or more applications and/or user interfaces 370 may further provide to the clients who have onboard one or more of their accounts or corresponding resources, a variety of services to assist in the management of the onboarded resources. For example, the one or more applications and/or user interfaces 370 may provide a platform for the clients to create new warehouse resources and manage existing ones. The one or more applications and/or user interfaces 370 may provide recommendations, alerts, notification, and other insights related to the client's warehouse resources. The one or more applications and/or user interfaces 370 may provide a service that automatically discovers the client's unmanaged warehouse resources—e.g., resources not yet associated with the cloud data management system 300 (such as those created prior to the client onboarding or those created outside of the cloud data management system 300). Once discovered, the unmanaged warehouse resources may be onboarded to the cloud data management system 300 and benefit from the various services provided by the cloud data management system 300. The one or more applications and/or user interfaces 370 may provide different or additional services.

For instance, the one or more applications and/or user interfaces 370 may provide a platform for clients to access, view, and/or run queries or DDL operations against their data warehouses hosted in the cloud-based data warehousing system 110. The cloud data management system 300 may employ a portable master library for the support of common functionalities such as error handling, logging, component resiliency, API call and transaction tracing, and security. In some instances, the clients may develop their own applications that may interface with the cloud-based data warehousing system 110 and the cloud data management system 300 may provide the libraries to the developers to import into their software code or API in a plug and play manner. The common services library, for example, may provide common functionality for the support of error and exception handling and may cause propagation, to the application layer, such as to the one or more applications and/or user interfaces 370, of errors and/or exceptions generated from the cloud-based data warehousing system 110 layer, such as SNOWFLAKE, or other layers between that and the application layer. The common services library may cause the conversion of error messages to a form that is appropriate to the particular user. In some cases, the library may additionally or alternatively, for a particular received error, route different error messages to different users. Conversion and routing of the error messages may be based on a profile associated with the user executing the application. Such that, for example, a developer may receive a more technical error message (e.g., a null pointer exception, display of malfunctioning code, a SQL error, or the like) than an end user may receive (e.g., an end user may instead receive a descriptive, user-friendly message, such as "Error in running query. Please retry."). The common services library may further provide standardized logging functions, and centralized resiliency functions, supporting multiple programming languages, frameworks (e.g., grpc remote procedure call (gRPC)), Java, Python, etc. The common services library need not be limited to use with the cloud-based data warehousing system 110, such as SNOWFLAKE, and may be utilized with other data services and/or platforms (e.g., DATABRICKS).

In order to provide the above discussed services, once a client has onboarded, the cloud data management system 300 may collect data from the clients. For example, a data collection module 320 of the cloud data management system 300 may collect data associated with the clients' various warehouse resources and their usage in the client warehousing system 110. For example, the collected data may relate to computing resource usage and costs, such as the usage of and cost related to processors, memory, communication bandwidth, or the like. For instance, Clients A, B, and C may have one or more accounts in the client warehousing system 110, such as client accounts 310b-i, and one or more corresponding cloud data warehouses, such as cloud data warehouses 110b-n, in the client warehousing system 110. The data management service provider may also maintain an account, such as data manager account 310a, and one or more corresponding cloud data warehouses 110a, in the cloud-based data warehousing system 110. To provide the data management services to the client accounts 310b-i, the cloud data management system 300 may use the data manager account 310a to collect data from the client accounts 310b-i at predetermined time periods, such as hourly, weekly, daily, etc. For example, the cloud data management system 300 may collect certain data from the client accounts 310b-i related to the clients' consumption and usage of cloud-based resources, such as data warehouse resources, and associated costs. The cloud data management system 300 may use the collected data to assist the clients in managing their costs and usage associated with consumption of the data warehouse resources by providing one or more recommendations, notifications, alerts, insights, etc. related to the data warehouse resources. This collection process is described in further detail with respect to FIGS. 5, 6A-6N, 7 and 8.

Upon collecting and receiving the data from the client accounts 310b-i, the cloud data management system 300 may perform one or more extract, transform, and load (ETL) or aggregations functions 330 to load the collected data into one or more tables for further processing. For instance, an ETL/aggregation module 330 may be used to load one or more tables or views that may be used by the cloud data management system 300 to provide the various services to the clients.

Figure 3B:
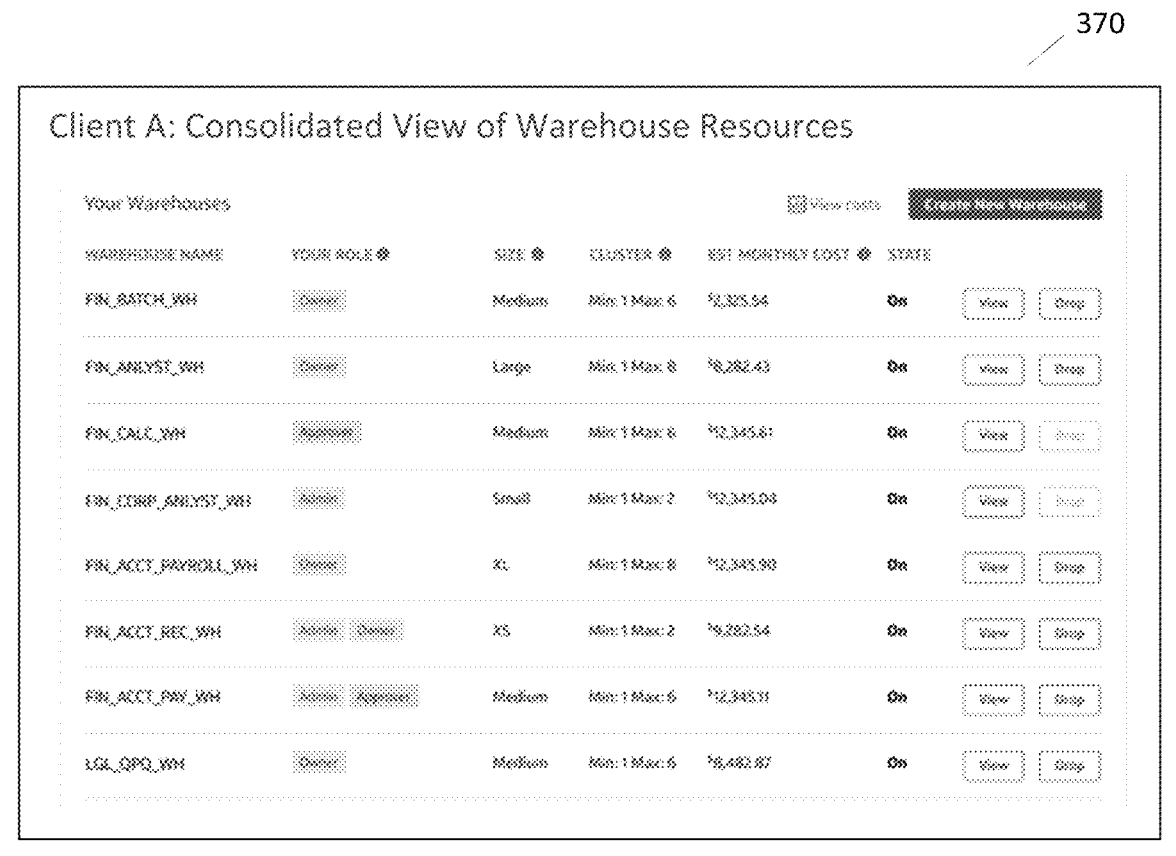

For example, the ETL/aggregation module 330 may be used to load one or more tables or views that may be used by a resource consolidation module 340 to generate and provide a centralized or consolidated view of the various resources from the cloud-based data warehousing system 110 that are used by the clients. The consolidated view of the various resources may be output via a user interface 370, such as a dashboard, or via one or more reports, messages, notifications, or the like, as shown in FIG. 3B.

Alternatively or additionally, the ETL/aggregation module 330 may be used to load one or more tables or views that may be used as input to a recommendation and insight engine 360. The recommendation and insight engine 360 may analyze the data collected from the client regarding the client's data warehouse usage and may output one or more recommendations, insights, alerts, or notifications. The recommendations, insights, alerts, or notifications may be, for example, recommendations for modifying one or more operating parameters of the data warehouse, notifications or alerts related to usage and/or cost spikes, recommendations for data warehouse scheduling, cost insights associated with warehouse resource usage, or the like. The recommendations, insights, alerts, or notifications may be output via one or more applications or user interfaces, such as the user interface 370, such as a dashboard, or via one or more reports, messages, notifications, or the like, as shown in FIG. 3B. The data warehouse analysis and recommendation generation process is described in further detail with respect to FIGS. 4A and 4B.

Alternatively or additionally, the ETL/aggregation module 330 may be used to load one or more tables or views that may be used by an unmanaged resources discovery module 350 to identify warehouse resources associated with the client, but not yet managed by the cloud data management system 300. The identified unmanaged resources may be output via the user interface 370, and the cloud data management system 300 may enable a client to onboard, via the user interface 370, such unmanaged resources into the cloud data management system 300. In some cases, when an unmanaged resource is onboarded to be managed by the cloud data management system 300, the cloud data management system 300 may cause data associated with such resources to be collected and analyzed, and recommendations, insights, etc. to be generated, as described below. The process of discovering unmanaged resources and onboarding such resources is described in further detail with respect to FIGS. 10A and 10B.

Figure 4A:
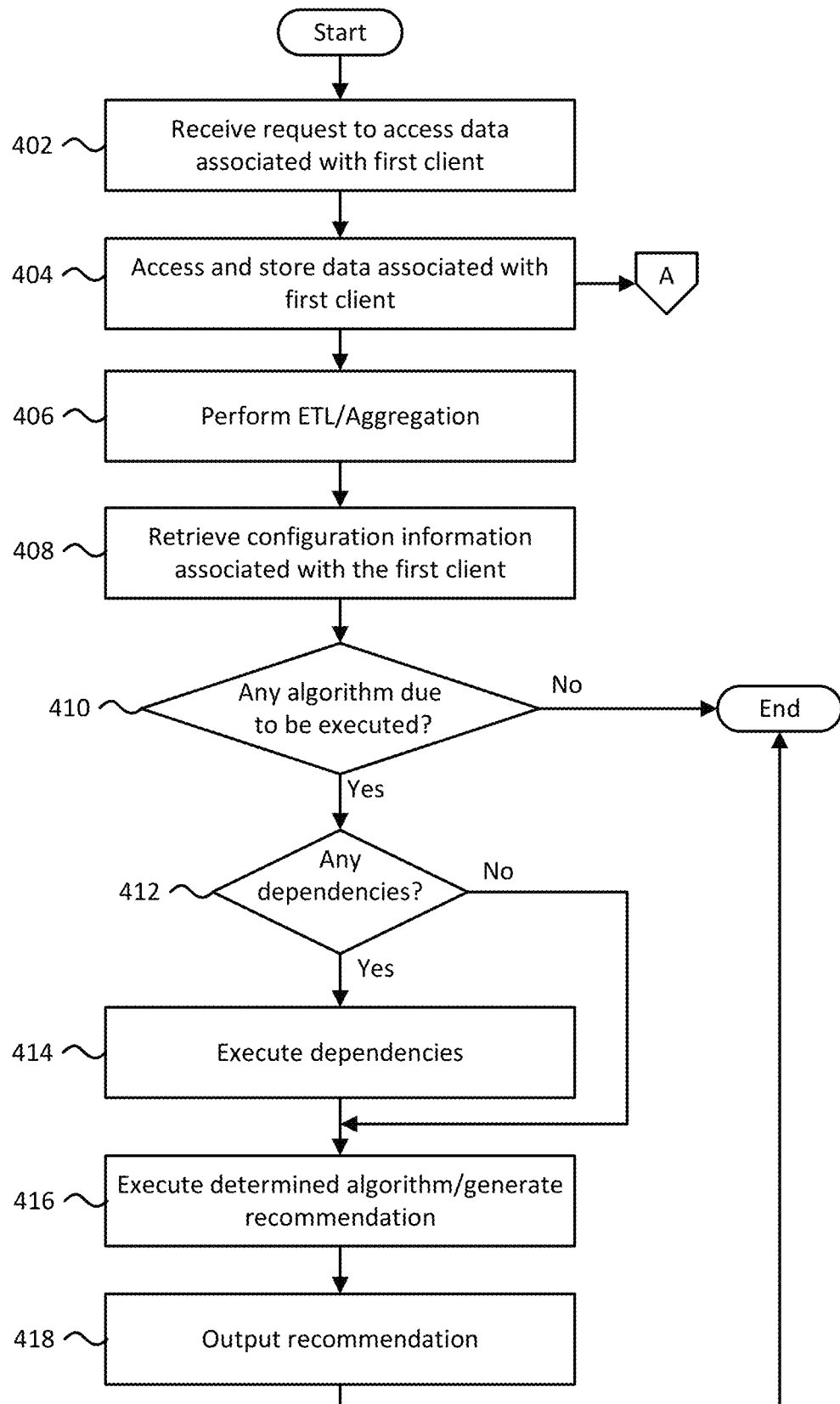
FIG. 4A shows an illustrative flowchart for performing a method of generating recommendations in a cloud-based data warehousing system, in accordance with one or more aspects described herein.
Figure 4B:
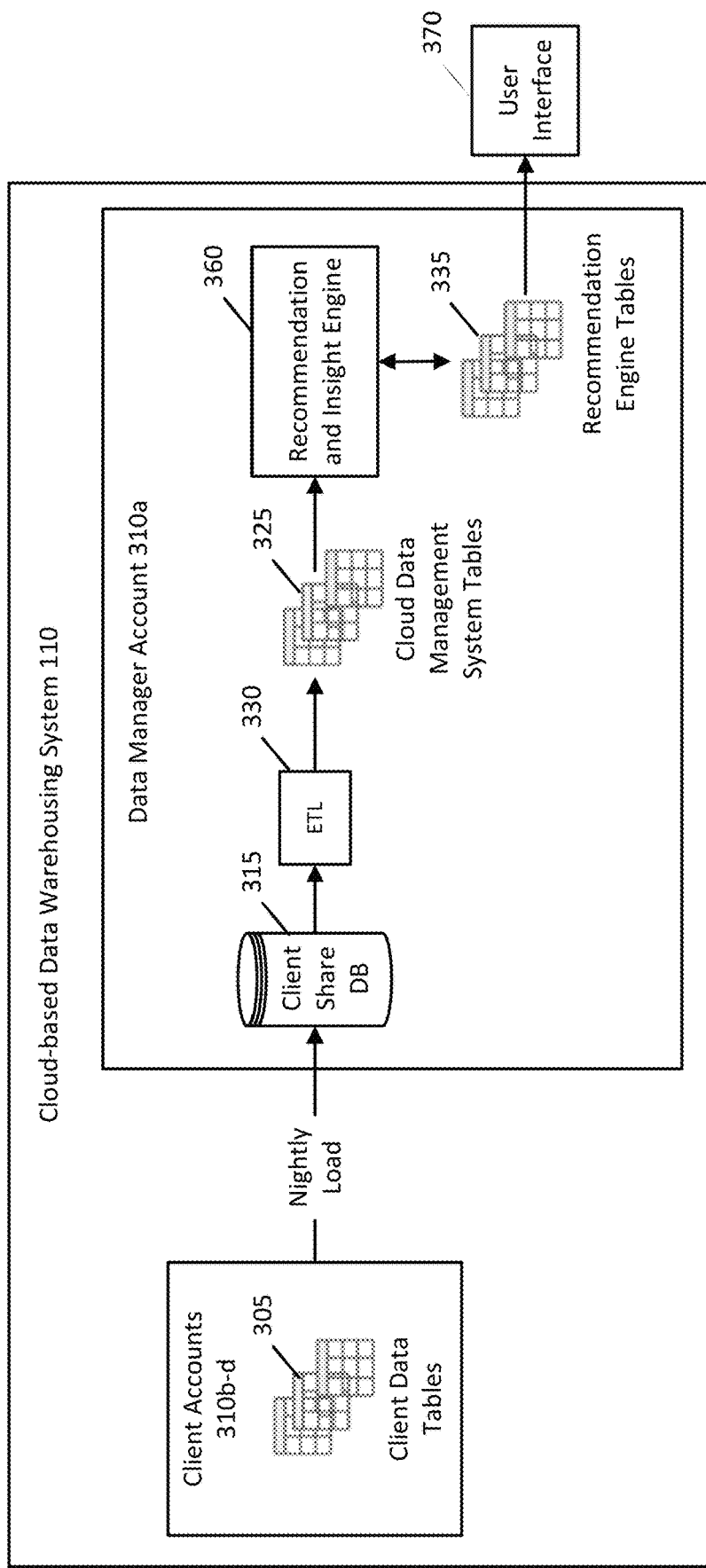
FIG. 4B shows an illustrative data flow related to the process described in FIG. 4A, in accordance with one or more aspects described herein.

FIG. 4A shows an exemplary process by which the cloud data management system 300 may provide recommendations to one or more client organizations utilizing the cloud-based data warehousing system 110. FIG. 4B illustrates an exemplary data flow related to the process described in FIG. 4A, in accordance with one or more aspects described herein.

Referring to FIG. 4A, at step 402, the data manager computing device 301 associated with a first data manager account 310a of the cloud-based data warehousing system 110 may receive a request to access data associated with a first client also hosted by the cloud-based data warehousing system 110. The first data manager account 310a may be hosted on a first cloud region of a cloud platform, such as Cloud Platform A. The request may be received via a user interface from a user, such as a system administrator, associated with the first client. In some cases, the request may be received from another process, such as a process to onboard data warehouse resources identified as associated with the first client but not yet managed within the cloud data management system 300. In some cases, a process may be executed to automatically schedule requests to access the data associated with the first client on a periodic basis, such as daily, weekly, hourly, etc. For instance, referring to FIG. 4B, the request may be to access data associated with Client A. The data may be associated with one or more client accounts 310a-d associated with Client A (such as Account A1 310b, Account A2 310c, and Account A3 310d) and hosted by the cloud-based data warehousing system 110. The request may be executed daily via a nightly process, for example.

The data may be data maintained by the first client in one or more cloud data warehouses 110b-n in the cloud-based warehousing system 110. For instance, the data may be stored in one or more client data tables 305 associated with the client accounts 310b-d and hosted by the cloud-based data warehousing system 110. The data may be associated with one or more data warehouse resources associated with the first client's cloud data warehouses 110b-n (e.g., data warehouses, databases, tables, views, columns, stored procedures, functions, policies, accounts, users, etc.). In some cases, the data may be associated with usage of the resources over a specified period of time, such as the past day, week, month, a custom time range, since a last execution time, etc. In some cases, the data may indicate costs associated with usage of the resources for the specified period of time. In some cases, the data may indicate one or more operating parameters of the resources, such as a quantity of memory, a processor speed, a number of nodes and/or clusters, a size, an on/off state, or the like.

Referring back to FIG. 4A, at step 404, the data manager computing device 301 may access the data associated with the first client. Accessing the data may involve accessing data from one or more accounts associated with the first client and hosted on different cloud regions or cloud platforms of the cloud-based data warehousing system 110. A process for accessing the data is described with respect to FIG. 5. Once the data is accessed, the data manager computing device 301 may store the accessed data in one or more tables or views associated with the data manager account 310a. For instance, as shown in FIG. 4B, the data may be stored in a client share database 315. Upon storing the data, the data manager computing device 301 may further insert a record into a client share load status table, in the client share database 315, indicating that the data has been loaded and is accessible.

At step 406, the data manager computing device 301 may execute one or more ETL and/or aggregation functions, such as via the ETL/aggregation module 330, to load the data into one or more tables and/or views in a uniform form and structure. The tables and/or views may be stored in one or more databases in the cloud data warehouse 110a associated with the data manager account 310a and may be usable by one or more recommendation algorithms and/or by the recommendation and insight engine 360. For instance, the data may be stored in one or more cloud data management system tables 325, such as shown in FIG. 4B.

At step 408, the data manager computing device 301 may retrieve, from one or more tables stored in one or more databases of the cloud data warehouse 110a associated with the data manager account 310a, recommendation configuration information associated with the first client. For instance, the recommendation configuration information may be stored in one or more of the recommendation engine tables 335, shown in FIG. 4B. The recommendation configuration information may include a plurality of recommendation configurations. The recommendation configurations may identify recommendation algorithms that may generate insights, recommendations, alerts, notifications, or the like related to a particular warehouse resource associated with the client, e.g., data warehouses, databases, accounts, schemas, tables, queries, or any other warehouse resource maintained in the cloud-based data warehousing system 110. The recommendation algorithms may additionally be stored in one or more of the recommendation engine tables 335. For instance, the recommendations engine tables 335 may store metadata and an executable path for each recommendation algorithm. The recommendation algorithm may be an executable, such as a stored procedure, that may be configured to generate data associated with an operating status of one or more warehouse resources. Each of the recommendation algorithms may accept one or more arguments. The recommendation algorithms may include, for example, a WAREHOUSE_LOAD algorithm, which may calculate how much load a data warehouse is under during a given time period; a WAREHOUSE SCHEDULE algorithm, which may generate a set of warehouse parameters, such as warehouse size, minimum and maximum cluster size, scaling policy, etc., which may dynamically change in accordance with a custom generated schedule, in some cases, the parameters and schedule may be determined based on a calculated load for the data warehouse, such as determined based on the WAREHOUSE_LOAD algorithm; a USAGE_SPIKE algorithm, which may generate an alert and/or cause a notification to be sent when usage of a particular resource exceeds a threshold usage amount; and/or a COST_SPIKE algorithm, which may generate an alert and/or cause a notification to be sent when costs associated with a particular resource exceed a threshold cost value. Additional examples of recommendation algorithms may include a QUERY_LOAD algorithm; a QUERY_ATTRIBUTES algorithm; an UNAUTHORIZED_ACCESS algorithm; WAREHOUSE_USAGE_ALERT algorithm; and a MALFORMED_SCRIPT algorithm.

As shown below in Table 1, the plurality of recommendation configurations may be stored in one or more tables in one or more databases of the cloud data warehouse 110a and may indicate the frequency (e.g., daily, weekly, bi-weekly, hourly, monthly, etc.) at which a particular recommendation algorithm is scheduled to be executed for a particular client and/or client account. For instance, a first recommendation algorithm may be configured to be executed weekly for the first client, but bi-weekly for a second client. The recommendation configurations may further indicate a type and a name of a resource that the associated recommendation algorithm is intended to operate on. The recommendation configurations may further indicate any arguments to be passed to the recommendation algorithm. The argument values may be, for example, a threshold value for indicating when the first client should be alerted regarding a cost spike or usage spike. As one example, a first client may require an alert when the particular resource usage is 10% above an average usage, and a second client may require an alert when the resource usage exceeds 15% of an average usage. Such threshold values may be passed as argument values to the recommendation algorithms. In some cases, the argument values may be based on the stored data accessed from the first client, such as the data stored in the client share database 315, shown in FIG. 4B. The recommendation configurations may further indicate whether the particular configuration is active. Although not shown, the recommendation configuration information may further indicate a status indicating when (e.g., a date/time) the corresponding recommendation algorithm was last executed.

TABLE 1

| Config ID | Client Account ID | Resource Type | Resource Name | Alg ID | Dep Config ID | Freq | Args | Active |
|---|---|---|---|---|---|---|---|---|
| 1 | Client1.Account1 | Warehouse | Mrktg_WH | 123 | [9, 10] | Daily | {arg1 = abc; arg2 = xyz} | Y |
| 2 | Client1.Account1 | Database | Payroll_DB | 456 | [5] | Hourly | {arg1 = fg} | Y |
| 3 | Client1.Account2 | Warehouse | HR_WH | 123 | NULL | Weekly | {arg1 = def; arg2 = wxy} | N |
| 4 | Client2.Account1 | Account | Sales_Accts | 789 | NULL | Daily | NULL | Y |

At step 410, the data manager computing device 301 may determine, based on the recommendation configuration information, whether any of the plurality of recommendation configurations indicate a recommendation algorithm that is due to be executed for the first client. That is, based on the frequency of execution and the last date/time a recommendation algorithm was executed as indicated in the recommendation configuration information, and the current date/time data, the data manager computing device 301 may determine whether any of the recommendation algorithms are due to be executed for the first client. If it is determined that one or more recommendation algorithms are due to be executed for the first client, the process may proceed to step 412, otherwise, the process may end.

At step 412, if it was determined that one or more recommendation algorithms are due to be executed for the first client, the data manager computing device 301 may determine, based on the recommendation configuration information, whether the particular recommendation algorithm(s) have any dependencies, e.g., any other recommendation algorithms that should be executed prior to execution of the determined one or more recommendation algorithms. For instance, if a first recommendation algorithm was determined to be due to be executed, such as Algorithm ID 123, shown in the first row of Table 1, the data manager computing device 301 may determine, based on the recommendation configuration information, that recommendation algorithms associated with Configuration IDs 9 and 10 should be run prior to Algorithm ID 123. As an example, if it was determined that the WAREHOUSE SCHEDULE algorithm is due to be executed for the first client, it may be determined that the WAREHOUSE_LOAD algorithm is a dependency of the WAREHOUSE SCHEDULE algorithm, as the calculated results of the WAREHOUSE_LOAD algorithm may be necessary to determine an optimal warehouse schedule by the WAREHOUSE_SCHEDULE algorithm. In this case, one or more calculated values output from the WAREHOUSE_LOAD algorithm may serve as one or more input parameters to the WAREHOUSE_SCHEDULE algorithm.

Where there are multiple dependencies, the recommendation configuration information may further indicate the sequence in which the dependencies should be executed. In the example provided, the recommendation algorithm associated with Configuration ID 9 should be executed, and then the recommendation algorithm associated with Configuration ID 10 should be executed.

If the data manager computing device 301 determined that there are dependencies for the recommendation algorithm due to be executed, then at step 414, the data manager computing device 301 may cause the dependencies to be executed in the order specified in the recommendation configuration information. The dependencies may be executed in the manner described below with respect to step 416. Otherwise, if no dependencies were identified, the process may proceed to step 416.

At step 416, after executing any dependencies, the data manager computing device 301 may cause the recommendation algorithm to be executed. The data manager computing device 301 may cause the recommendation algorithm to be executed by passing the recommendation configuration information (such as the algorithm arguments), the recommendation algorithm, and the stored data accessed from the first client, e.g., stored in the cloud data management system tables 325, into the recommendation and insight engine 360. The recommendation and insight engine 360, using some or all of the passed information, may cause the stored data (e.g., data associated with usage of the first client's warehouse resources, costs associated with usage of the warehouse resources, one or more operating parameters of the resources, or the like) to be analyzed for generating recommendations, insights, alerts, notifications, etc. related to usage of the first client's warehouse resources. For instance, if the recommendation algorithm was configured to analyze data associated with the first client cloud data warehouse 110b, the recommendations may include one or more recommended operating parameters for operating the cloud data warehouse 110b, a recommended schedule for operating the cloud data warehouse 110b, a recommended size for the cloud data warehouse 110b, a recommendation to move peak workload to a different data warehouse associated with the first client, or the like. In some cases, the recommendation may be in the form of an alert, such as an alert notifying of a spike in usage or costs associated with the cloud data warehouse 110b during a particular period of time. The spike may be identified based on determining usage of the cloud data warehouse 110b, of a computing resource associated with the cloud data warehouse 110b, or costs associated with usage of the cloud data warehouse 110b, exceeding a threshold value (such as a threshold value passed as an argument to the recommendation algorithm). The threshold value may be an absolute value or a percentage value. For example, if the data manager computing device 301 determines the computing resource usage exceeds a percentage of computing resources that are subscribed by the client, a notification may be sent. The notification may be sent to a device associated with the client, such as client device 120. In some cases, the threshold value may be based on an identified pattern of usage associated with the cloud data warehouse 110b for the period of time. The recommendation and insight engine 360 may cause the generated recommendations, insights, alerts, or notification to be stored in one or more tables or views associated with the data manager account 310a, such as in the recommendation engine tables 335, shown in FIG. 4B.

Figure 4C:
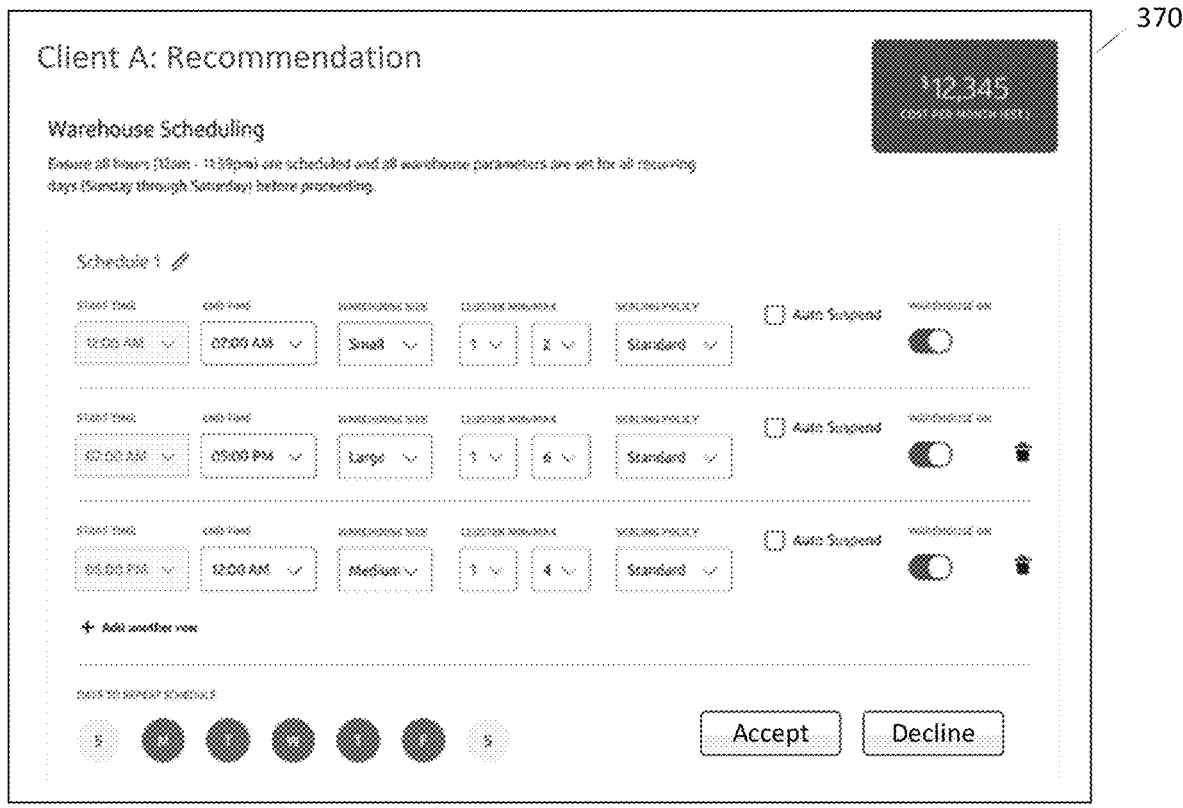
FIG. 4C shows an illustrative user interface displaying a generated recommendation, in accordance with one or more aspects described herein.

At step 418, the data manager computing device 301 may cause the generated recommendations, insight, alerts, notifications, etc. to output, via a user interface (such as a dashboard), one or more messages, one or more reports, one or more applications, or the like. For instance, recommendations generated and stored in the recommendation engine tables 335 may be output to the user interface 370, as shown in FIG. 4C. For instance, if the WAREHOUSE SCHEDULE algorithm was executed at step 416, a recommended schedule such as shown in FIG. 4C may be output to the user interface 370. Additionally or alternatively, the data manager computing device 301 may send one or more messages including the generated recommendations, insight, alerts, notifications, etc. The messages may be sent, for example, to a system administrator associated with the first client. The messages may group the recommendations, insights, alerts, notifications, etc. based on the type so that a single message might include multiple recommendations, insights, alerts, notification, etc. of the same type—such as cost related insights, usage spike alerts, etc. In some cases, the user interface 370 may provide one or more options for a user to accept or decline the recommendation. For instance, accepting the recommendation may cause the one or more parameters associated with the related data warehouse resource to be set or updated in accordance with the recommendation. Declining the recommendation may result in no changes being made to the parameters associated with the related data warehouse resource.

Accordingly, a first computing device, such as the data manager computing device 301, associated with a first data manager account hosted in a first cloud region of a cloud-based data warehouse system may receive a request to collect data from one or more client accounts associated with a first client and hosted by the cloud-based data warehouse system. Based on determining that a first client account, of the one or more client accounts, is hosted in a second cloud region: the first computing device may (1) send to a second computing device associated with the first client account, first instructions configured to cause the second computing device to share, with a second data manager account hosted in the second cloud region of the cloud-based data warehouse system, data from the first client account; and (2) send to a third computing device associated with the second data manager account, second instructions configured to cause the third computing device to replicate the shared data to the first data manager account, upon receiving an indication that the shared data is accessible. The first computing device may receive an indication that the shared data has been replicated. The first computing device may store the shared data, based on the indication that the shared data has been replicated. The first computing device may store the shared data in a database associated with the first manager account. The first computing device may retrieve configuration information associated with a plurality of different recommendation algorithms associated with the first client. The configuration information may indicate an execution frequency for each of the plurality of algorithms. The first computing device may retrieve information indicating a last execution date for each of the plurality of algorithms. The first computing device may determine, based on the configuration information, the execution frequency of each of the plurality of algorithms, and the last execution date for each of the plurality of algorithms, that a first recommendation algorithm of the plurality of different algorithms is scheduled for execution. The first computing device may, using the shared data, cause execution of the first recommendation algorithm. The first computing device may, based on execution of the first recommendation algorithm, receive at least one recommendation associated with a first data warehouse associated with the first client and output the at least one recommendation.

The second instructions may further be configured to cause the third computing device to create a second data warehouse comprising at least one database for receiving the shared data, and to drop the second data warehouse after replicating the shared data to the first data manager account.

The first computing device may cause execution of the first recommendation algorithm by causing an analysis of the stored shared data to determine one or more load metrics associated with usage of the first data warehouse during a period of time, and by generating, based on the one or more load metrics, a recommended schedule for operating the first data warehouse with different operating parameters for different periods of time. The first computing device may receive the at least one recommendation by receiving the recommended schedule for operating the first data warehouse.

The first computing device may cause execution of the first recommendation algorithm (1) by determining, based on the configuration information, one or more dependencies associated with the first recommendation algorithm, the one or more dependencies may include one or more second recommendation algorithms; (2) by determining, based on the configuration information, a sequence of execution of the one or more second recommendation algorithms; and (3) by causing, prior to causing execution of the first recommendation algorithm, in the determined sequence, and using the stored shared data, execution of the one or more second recommendation algorithms.

The stored shared data may include information associated with computing resource usage of the first data warehouse during a period of time, and the first computing device may cause execution of the first recommendation algorithm by analyzing the information associated with the computing resource usage of the first data warehouse during the period of time to generate the at least one recommendation.

The first computing device may, based on receiving the at least one recommendation, cause one or more of: (1) modification of one or more operating parameters associated with operating the first data warehouse, (2) setting of a schedule for operating the first data warehouse, or (3) modification of a size of the first data warehouse.

The first computing device may, based on the configuration information, determine a second recommendation algorithm. The first computing device may, using the stored shared data, cause execution of the second recommendation algorithm. The second recommendation algorithm may be configured to analyze the stored shared data to determine a metric associated with usage of a first computing resource associated with the first data warehouse, and based on the metric, determine that usage of the first computing resource exceeds a threshold. The first computing device may, based on the execution of the second recommendation algorithm, transmit to a user device a notification indicating a usage spike associated with the first computing resource.

Additionally or alternatively, as is described below in further detail with respect to FIG. 9A, clients of the cloud data management system 300 may automatically have one or more of their accounts configured to receive recommendations and insights upon client onboarding into the cloud data management system 300. Client accounts of the cloud data management system 300 may also be automatically configured to receive any new recommendations or insights as they are deployed.

Figure 5:
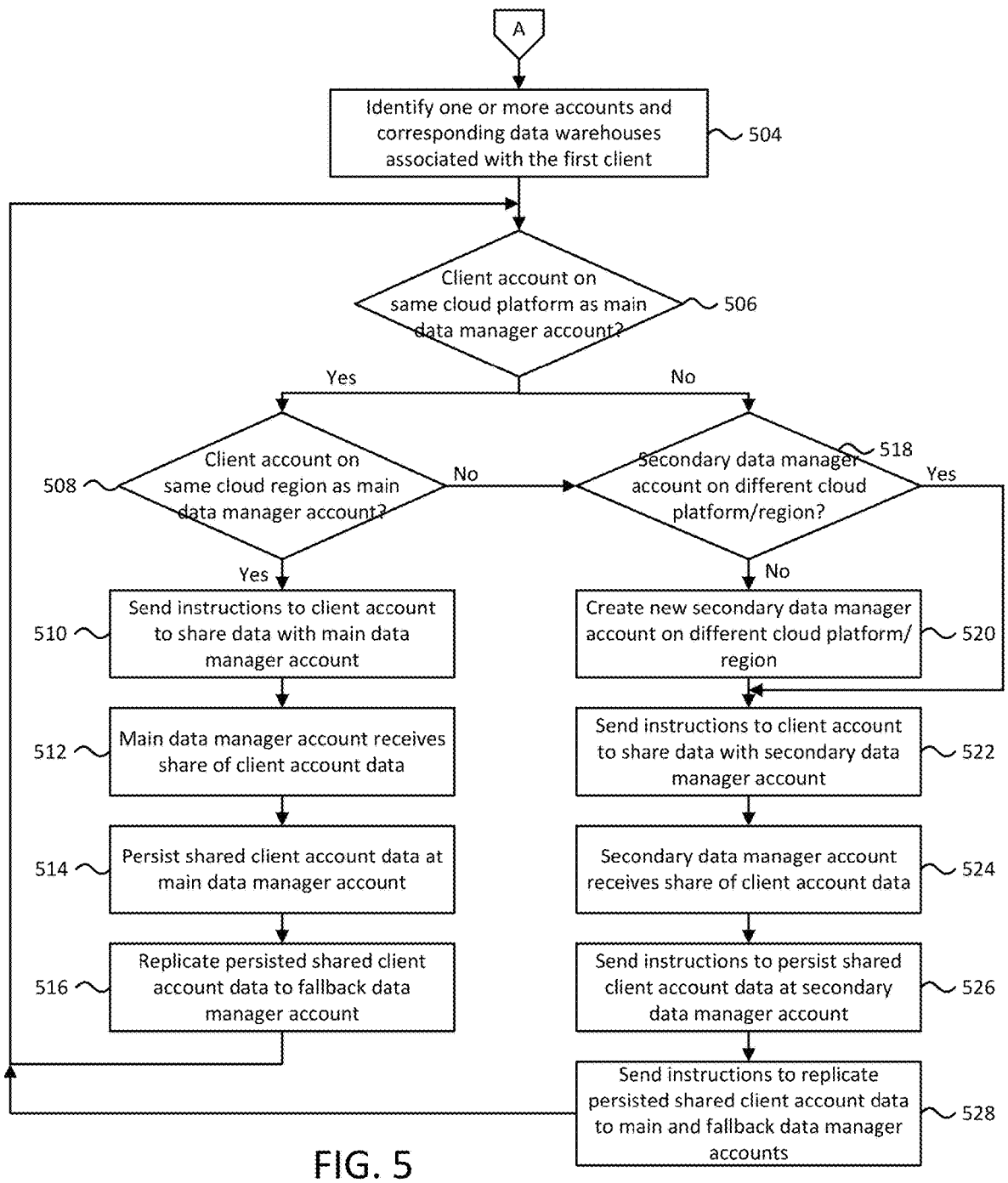
FIG. 5 shows an illustrative flowchart for performing a data collection and sharing method, in accordance with one or more aspects described herein.
Figure 6A:
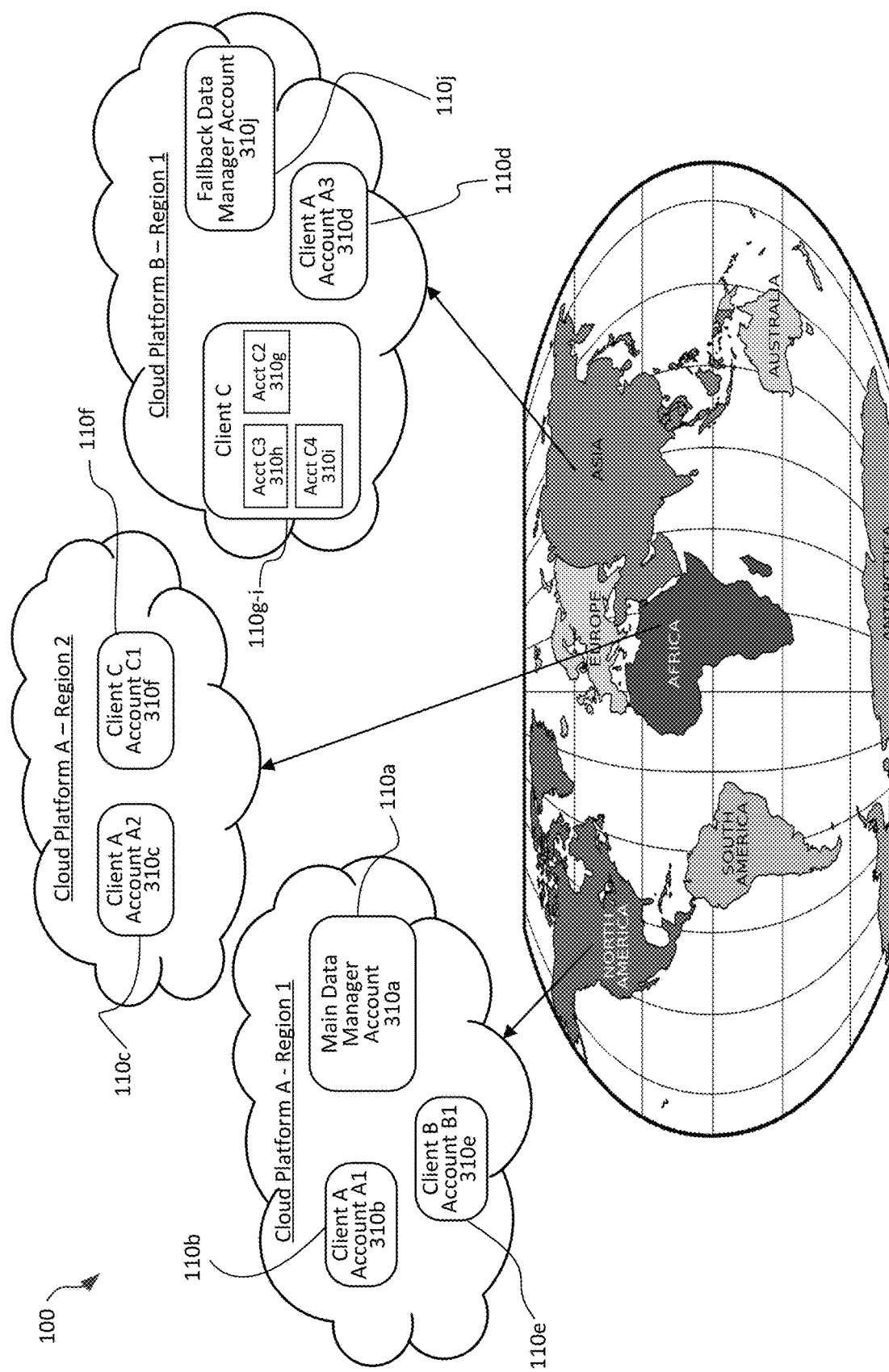
FIG. 6A illustrates an illustrative cloud-based data warehousing system during the data collection and sharing method described in FIG. 5.

FIG. 5 shows an exemplary flowchart for performing a data collection or sharing method, in accordance with one or more aspects described herein. FIG. 6A illustrates a cloud-based data warehousing system, such as the cloud-based data warehousing system 110 described with respect to the data collection or sharing method of FIG. 5.

The data collection or sharing method described with respect to FIG. 5 may be a method used by the cloud data management system 300 to collect or access data within the cloud-based data warehousing system 110. The cloud-based data warehousing system 110 may comprise the SNOWFLAKE data architecture, for example. The method of FIG. 5 may be implemented by the data manager computing device 301 associated with the cloud data management system 300. The method may be performed at step 404 of FIG. 4A, in response to a request to access data associated with a first client account.

As discussed above, the cloud-based data management system 300 may provide a service to one or more organizations having accounts with the cloud-based data warehousing system 110, such as Clients A, B, and C. For instance, as shown in FIG. 3A, Client A may have one or more accounts, such as Account A1 310b, Account A2 310c, and Account A3 310d, hosted in the cloud-based data warehousing system 110; Client B may also have one or more accounts, such as Account B1 310e, hosted in the cloud-based data warehousing system 100; and Client C may have more than one account, such as Account C1 310f, Account C2 310g, Account C3 310h, and Account C4 310i, hosted in the cloud-based data warehousing system 100.

The data manager computing device 301 associated with the cloud data management system 300 may collect data from the client organizations' accounts, such as Accounts A1 310b, A2 310c, A3 310d, B1 310e, C1 310f, C2 310g, C3 310h, and C4 310i at predetermined time periods or based on a request to access the data in order to perform analysis, recommendation, and/or reporting functions. For example, the data manager computing device 301 may collect certain data from the client organizations' accounts related to the clients' consumption and usage of the data warehouse resources or other cloud resources associated with the cloud-based data warehousing system 110, and the cloud data management system 300 may use the collected data to assist the clients in managing their costs and usage associated with consumption of the data warehouse resources. As discussed above, the cloud data management system 300 may maintain an account on the cloud-based data warehousing system 110, such as a data manager account 310a, used for collecting such data from the client accounts. In some cases, the cloud data management system 300 may also maintain a fallback account on the cloud-based data warehousing system 110, which may serve as a backup or a fallback data manager account 310j in the event of a failure at the main data manager account 310a, or at the cloud platform and/or the cloud region that hosts the main data manager account 310a. In some cases, the main data manager account 310a (or fallback data manager account 310j) and one or more of the client accounts 310b-i may maintain or be associated with one or more data warehouses 110b-n that are hosted on the same cloud region of the same cloud platform, and in other cases the main data manager account 310a (or the fallback data manager account 310j) and one or more of the client accounts 310b-i may maintain or be associated with one or more data warehouses 110b-n that are hosted on different cloud regions and/or cloud platforms from one another.

For example, referring to FIG. 6A, Client A's Account A1 310b may be associated with data warehouse 110b, Client B's Account B1 310e may be associated with data warehouse 110e, and the main data manager account 310a may be associated with data warehouse 110a. In this example, the data warehouses 110a, 110b, and 110e may all be hosted on Cloud Platform A in Region 1.

As another example, Client C's Account C1 310f may be associated with data warehouse 110f and Client A's Account A2 310c may be associated with data warehouse 110c. In this example, the data warehouses 110f and 110c associated with Accounts C1 310f and A2 310c may be hosted on the same cloud platform, e.g., Cloud Platform A, as the data warehouse 110a associated with the main data manager account, but may be hosted in a different cloud region of that cloud platform, e.g., Region 2.

As a further example, Client C's Accounts C2 310g, C3 310h, and C4 310i may be associated with data warehouses 110g-i and Client A's Account A3 may be associated with data warehouse 110d. In this example, the data warehouses 110d and 110g-i associated with Accounts A3 310d, C2 310g, C3 310h, and C4 310i may be hosted on a different cloud platform from the data warehouse 110a associated with the main data manager account 310a. For example, the data warehouses 110d and 110g-i may be hosted on Cloud Platform B. The fallback data manager account 310j may be associated with data warehouse 110j and may also be hosted on the Cloud Platform B.

The data manager computing device 301 may collect, using the main data manager account 310a, data from one or more of Clients A, B, and C's Accounts A1 310b, A2 310c, A3 310d, B1 310e, C1 310f, C2 310g, C3 310h, and/or C4 310i to perform one or more analytics, reporting, recommendation, or other functions. For example, referring back to FIG. 4A, after receiving, at step 402, a request to access data associated with a first client, the data manager computing device 301 may, at step 504 of FIG. 5, identify one or more accounts associated with the first client. For instance, a request may have been received for the main data manager account 310a to access data associated with accounts belonging to a first client. The first client may be Client A, B, or C, for example. The data manager computing device 301 may further identify the one or more data warehouses 110b-n associated with each of the identified one or more accounts. For instance, the data manager computing device 301 may store or access information indicating one or more accounts associated with the first client and the corresponding one or more data warehouses 110b-n associated with the client's one or more accounts. The information may further indicate, for each of the data warehouses 110b-n associated with the first client's one or more accounts, the cloud platform and the cloud region on which the data warehouse 110b-n is hosted. The information may further include a data element indicating whether the account is a primary account or a secondary account (or sub account). That is, in some cases, the first client may maintain multiple accounts which are hosted on a given cloud platform and cloud region. In such cases, one of the multiple accounts may be identified as a primary account, while the others may be identified as secondary accounts. For instance, referring to FIG. 6A, Client C may maintain multiple accounts which are hosted in Region 1 of Cloud Platform B, e.g., Accounts C2 310g, C3 310h, and C4 310i. One of these accounts, such as Account C2 310g, may be identified as a primary account and the remaining accounts, such as C3 310h and C4 310i, may be identified as secondary accounts. Primary accounts may be used to consolidate data and coordinate sharing between the client's multiple accounts hosted on a particular cloud region/platform and one or more accounts outside of that cloud region/platform.

Referring back to FIG. 5, At step 506, the data manager computing device 301 may determine whether the first client has an account associated with a data warehouse 110b-n that is hosted on the same cloud platform as the data warehouse 110a associated with the main data manager account 310a. This determination may be necessary in view of the native sharing functionality provided by the cloud-based data warehousing system 110. Typically, accounts may directly share data through the cloud-based data warehousing system 110 when those accounts are hosted on the same cloud platform and in the same cloud region. However, in some systems, such as SNOWFLAKE, the native functionality of the system may prohibit the sharing of data to an account hosted on a different cloud region and/or cloud platform. This technical limitation might not be resolved through the use of replication from one account to another within the cloud-based data warehousing system 110, since these systems may further prohibit the replication of data to accounts associated with different organizations. Accordingly, the data manager computing device 301 may determine whether any of the first client's accounts are associated with a data warehouse 110b-n hosted on the Cloud Platform A, e.g., the same cloud platform as the data warehouse 110a associated with the main data manager account 310a. If one of the client's account, such as a first client account, is associated with a data warehouse 110b-n that is hosted on the same cloud platform as the data warehouse 110a associated with the main data manager account 310a, then the method may proceed to step 508 to further determine whether the accounts are hosted in the same cloud region, otherwise the method may proceed to step 518.

If it was determined that a first client account (or multiple client accounts) is associated with a data warehouse 110b-n hosted on the same cloud platform as the data warehouse 110a associated with the main data manager account 310a, then at step 508, the data manager computing device 301 may determine whether the data warehouse 110b-n associated with the first client account is also hosted in the same cloud region as the data warehouse 110a associated with the main data manager account 310a. For instance, the data manager computing device 301 may determine whether the data warehouse 110b-n associated with the first client account is hosted on Region 1 of Cloud Platform A. If the first client account is associated with a data warehouse 110b-n hosted on the same cloud region as the data warehouse 110a associated with the main data manager account 310a, then the method may proceed to step 510, otherwise the method may proceed to step 518.

If it was determined that the first client account (or multiple client accounts) is associated with a data warehouse 110b-n hosted on the same cloud region as the data warehouse 110a associated with the main data manager account 310a, e.g., on Region 1 of Cloud Platform A, then at step 510, the data manager computing device 301 may send, to a computing device associated with the data warehouse 110b-n associated with the first client account, instructions for the first client account to share its data with the main data manager account 310a. Further, when the first client has multiple accounts that are associated with data warehouses 110b-n hosted in the same cloud region, the data manager computing device 301 may identify one of those accounts as the primary account based on the primary account flag (identified at step 504), and the instructions may indicate for only the flagged primary account to share its data with the main data manager account 310a. In this case, the instructions may first cause the remaining accounts, e.g., the secondary accounts, to share their respective data with the primary account, and after the data associated with the secondary accounts is shared to the primary account, the instructions may cause the primary account to share its data and the shared data from the secondary accounts with the main data manager account 310a.

The instructions may further indicate one or more data warehouse resources or objects (e.g., maintained in the data warehouse 110b-n associated with the first client account) that are requested for sharing. For instance, the instructions may indicate one or more schemas, databases, tables, views, stored procedures, functions, columns, and/or the like to be shared with the main data manager account 310a. Sharing may involve the first client account providing permission for the main data manager account 310a to access the requested data warehouse objects maintained in the first client account's data warehouse 110b-n. Such sharing may be accomplished without copying or transferring any actual data between accounts. For example, the sharing may be enabled via the architecture of the cloud-based data warehousing system 110, such as through the use of metadata.

At step 512, in response to the instructions to share the first client account's data with the main data manager account 310a, the data warehouse 110a may receive a share of the data associated with the first client account. In this case, the first client account (e.g., the sharing or source account) may create a share of one or more of their data warehouse objects (e.g., maintained in the data warehouse 110b-n) and may grant permission to the main data manager account 310a to access the requested data warehouse objects (e.g., as requested in the instructions sent at step 510) within the data warehouses 110b-n. Receiving the share may involve the automatic creation, in the data warehouse 110a associated with the main data manager account 310a, of a read-only database created from the share. Once created, all of the shared data warehouse objects may be accessible from the main data manager account 310a.

At step 514, the data manager computing device 301 may persist, such as cache or store, the shared data in the data warehouse 110a associated with the main data manager account 310a. The data may be persisted permanently or temporarily. For instance, the persisted data may be stored in a database table of the data warehouse 110a associated with the main data manager account 310a. Persisting the data in this manner may be important because native functionality of the cloud-based data warehousing system 110, such as SNOWFLAKE, may prohibit the sharing of data to an account hosted on a different cloud region and/or cloud platform and may further prohibit the replication of a share. The cloud data management system 300, however, may need to copy or otherwise transmit the shared data to another data manager account maintained by the cloud data management system 300, such as on another cloud region or another cloud platform, to serve as a backup or a fallback data manager account 310j in the event of a failure at the main data manager account 310a, or at the cloud platform and/or the cloud region that hosts the main data manager account 310a.

At step 516, the data manager computing device 301 may cause the persisted shared data to be replicated (e.g., copied) to another account associated with cloud data management system 300 and hosted on a different cloud region or different cloud platform from the cloud region/platform that hosts the data warehouse 110a associated with the main data manager account 310a. In this case, the persisted data may be replicated to a secondary and/or fallback data manager account 310j associated with a data warehouse 110j hosted on the different cloud region or cloud platform, for instance on the Region 2 of the Cloud Platform A or Region 1 of the Cloud Platform B. After replicating the data to the fallback data manager account 310j, the method may return to step 506 to process any additional identified accounts associated with the first client. If there are no additional accounts, the method may end.

If it was determined that the data warehouse 110b-n associated with the first client account is not hosted on the same cloud platform as the data warehouse 110a associated with the main data manager account 310a (such as at step 506) or is not hosted on the same cloud region as the data warehouse 110a associated with the main data manager account 310a (such as at step 508), then at step 518, the data manager computing device 301 may determine whether a data manager account, such as a secondary data manager account, associated with the cloud data management system 300 exists on the different cloud platform or different cloud region where the data warehouse 110b-n associated with the first client account is hosted. For instance, the data manager computing device 301 may store or access information indicating cloud platforms and cloud regions where the cloud data management system 300 has data manager accounts.

The cloud data management system 300 may maintain one or more secondary data manager accounts 310k, other than the main data manager account 310a, on different cloud platforms and/or cloud regions. One or more of these secondary data manager accounts 310k may be used as a backup and/or fallback account in the event the main data manager account 310a, or the cloud platform or cloud region on which it is hosted, is down. The secondary data manager accounts 310k, additionally or alternatively, may have been previously created in accordance with aspects described herein. The information indicating the secondary data manager accounts 310k on the different cloud platform or different cloud region may further indicate information identifying the specific data warehouses 110b-n associated with the secondary data manager accounts 310k. If it is determined that there is no secondary data manager account 310k on the different cloud platform or the different cloud region, the method may proceed to step 520, otherwise the method may proceed to step 522.

If it was determined that there is currently no secondary data manager account 310k on the different cloud platform or the different cloud region where the first client account is hosted, then at step 520, the data manager computing device 301 may cause a new secondary data manager account 310k to be created on that cloud platform or cloud region. This may be necessary as a result of technical limitations associated with the native features of the cloud-based data warehousing system 110, such as SNOWFLAKE, which may otherwise prohibit the sharing of data, within the cloud-based data warehousing system 110, to an account hosted on a different cloud platform or cloud region, or may prohibit the replication of data to an account associated with a different organization. Accordingly, to facilitate the sharing and/or replication of data in such cases, a new secondary data manager account 310k may be created (e.g., on-demand) on the different cloud platform and/or cloud region where the first client account is hosted when a data manager account does not currently exist there. The data manager computing device 301 may execute a script that may cause the new data manager account 310k to be created and configured on the different cloud platform or the different cloud region where the first client account is hosted. Creating and configuring the new secondary data manager account 310k may further involve the instantiation and configuration of a new virtual data warehouse 110k to be associated with the new secondary data manager account 310k. The script may include configuration information indicating computing resources that should be associated with the new data warehouse 110k, for example, a quantity of memory, a processor speed, a number of nodes and/or clusters, or the like. The configuration information may further indicate a duration of time for which the new data warehouse 110k should be available—such as an hour, a day, a week, indefinitely, etc. After the duration of time the data manager computing device 301 may cause the new data warehouse 110k to be dropped or suspended. Additionally or alternatively, the configuration may be based on information included in the request, such as information indicating an amount of data to be shared. Additionally, as part of the configuration of the new data warehouse 110k, the script may further cause the creation of one or more databases, schemas, and/or database objects, in the new data warehouse 110k, to support the data collection function of the cloud data management system 300. For instance, the one or more created databases may be used to store data collected from the first client account.

If it was determined that a secondary data manager account 310k on the different cloud platform or the different cloud region where the first client account is hosted already exists (at step 518), such as the fallback data manager account 310j, or if a new secondary data manager account 310k was created (at step 520), then at step 522, the data manager computing device 301 may send, to a computing device associated with the data warehouse 110b-n associated with the first client account, instructions for the first client account to share its data with the secondary data manager account 310k. When the client has multiple accounts that are associated with the data warehouses 110b-n hosted on the same cloud region, based on the primary account flag, the primary account may be identified and the instructions may indicate for only the flagged primary account to share its data with the secondary data manager account 310k. In this case, the instructions may first cause the secondary accounts to share their respective data with the primary account and, after the data associated with the secondary accounts is shared to the primary account, the instructions may cause the primary account to share its data and the shared data from the secondary accounts with the secondary data manager account 310k.

The secondary data manager account 310k may be the newly-created secondary data manager account 310k that is hosted on the same cloud platform or cloud region as the first client account or may be a fallback data manager account 310j or another previously-created secondary data manager account 310k. The instructions may further indicate one or more data warehouse objects (e.g., maintained in the data warehouse 110b-n associated with the first client account) that are requested for sharing. For instance, the instructions may indicate one or more schemas, databases, tables, views, stored procedures, functions, columns in a database table, or the like to be shared with the secondary data manager account 310k.

At step 524, in response to the instructions to share the first client account's data with the secondary data manager account 310k, the data warehouse 110k associated with the secondary data manager account 310k may receive a share of the data associated with the first client account. In this case, the first client account (e.g., the sharing or source account) may create a share of one or more of their data warehouse objects (e.g., maintained in the data warehouse 110b-n) and may grant permission to the secondary data manager account 310k to access the requested data warehouse objects (e.g., as requested in the instructions sent at step 322) within the data warehouse 110b-n. The shared data warehouse objects may, as a result, be accessible from the secondary data manager account 310k.

At step 526, the data manager computing device 301 may send instructions to a computing device associated with the data warehouse 110k associated with the secondary data manager account 310k, to persist the shared data in the data warehouse 110k associated with the secondary data manager account 310k. For instance, the persisted data may be stored in a database table of the data warehouse 110k associated with the secondary data manager account 310k.

At step 528, the data manager computing device 301 may send instructions to the computing device associated with the secondary data manager account 310k, to replicate the persisted shared data to the data warehouse 110a associated with the main data manager account 310a. In this way, aspects of this disclosure may allow for the replication, within the cloud-based data warehousing system 110, of the client account's data to the main data manager account 310a of the cloud data management system 300, despite the fact that the underlying data is associated with a different organization, thereby overcoming a limitation of native features of a cloud-based data warehousing system 110, such as SNOWFLAKE, which conventionally might prohibit such data replication. In some cases, the instructions may further indicate that the persisted shared data should further be replicated to one or more fallback data manager accounts 310j associated with the cloud data management system 300.

After replicating the data to the main data manager account 310a and/or the fallback data manager account 310j, the method may return to step 506 and steps 506-528 may be repeated for each identified account associated with the first client. After each of the accounts has been processed, the method may end and the process may return to step 404 of FIG. 4A.

The method of FIG. 5 is further described with reference to FIGS. 6A-6L.

Figure 6B:
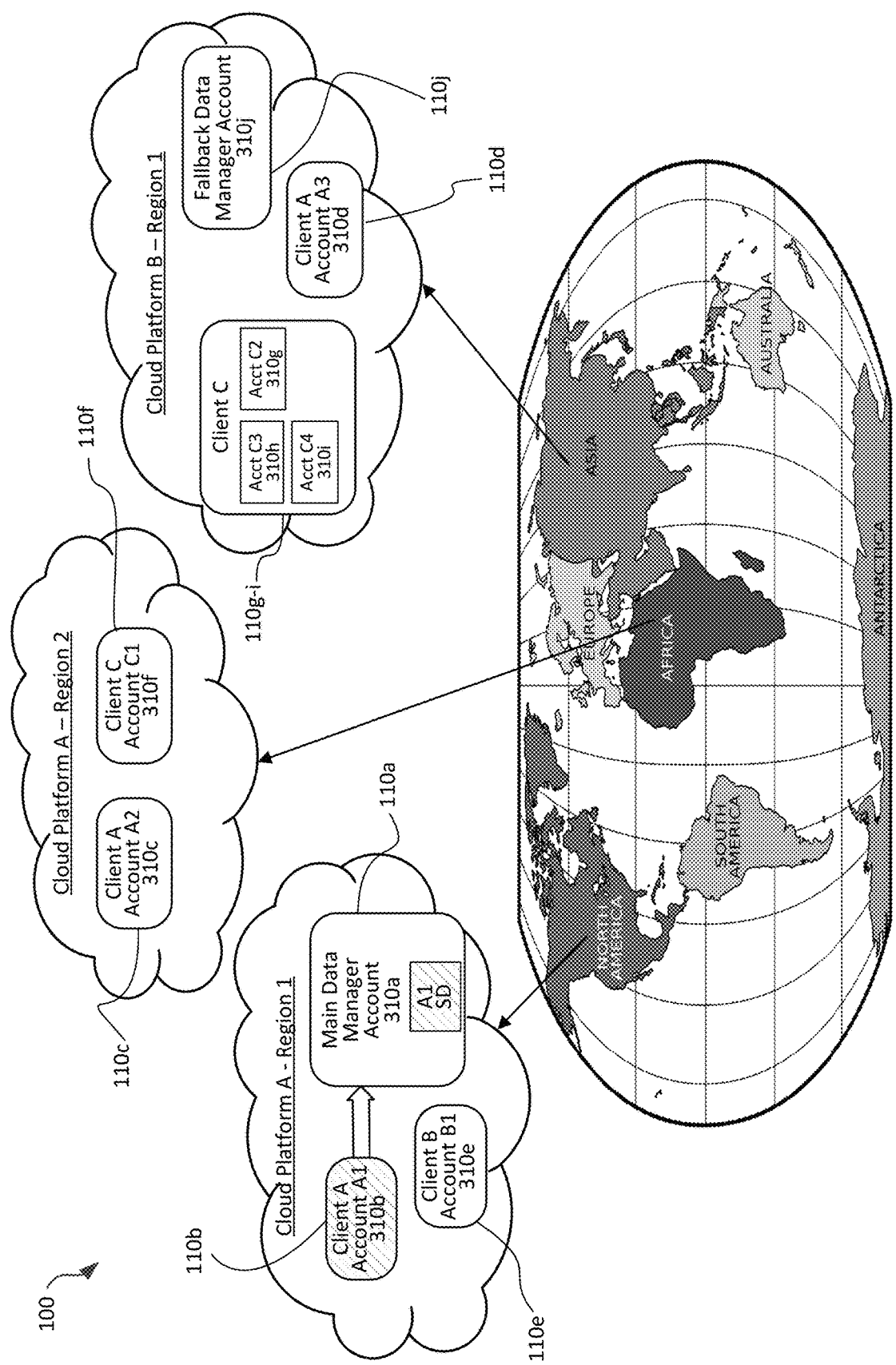
FIG. 6B illustrates an illustrative cloud-based data warehousing system during the data collection and sharing method described in FIG. 5.
Figure 6C:
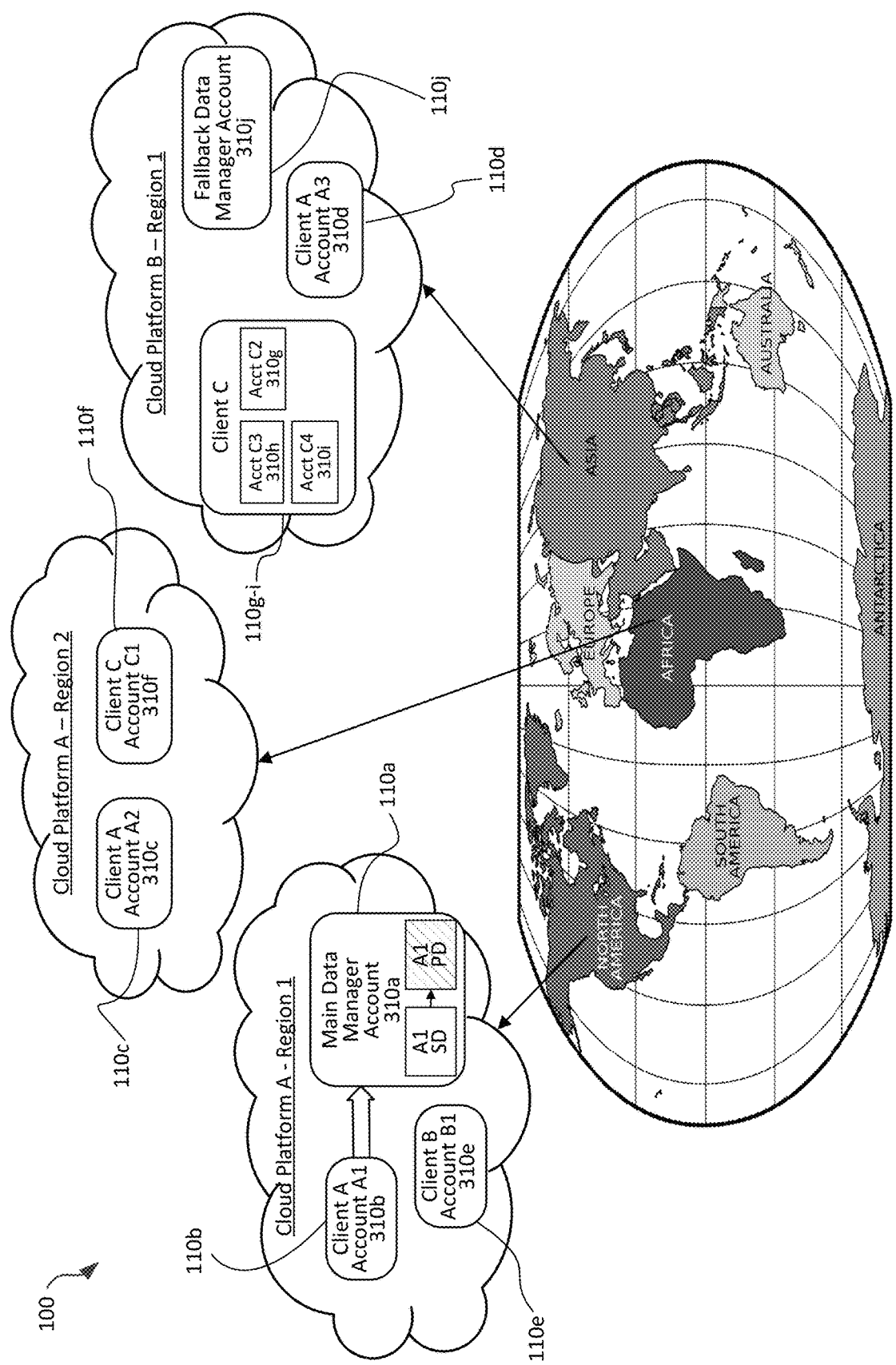
FIG. 6C illustrates an illustrative cloud-based data warehousing system during the data collection and sharing method described in FIG. 5.
Figure 6D:
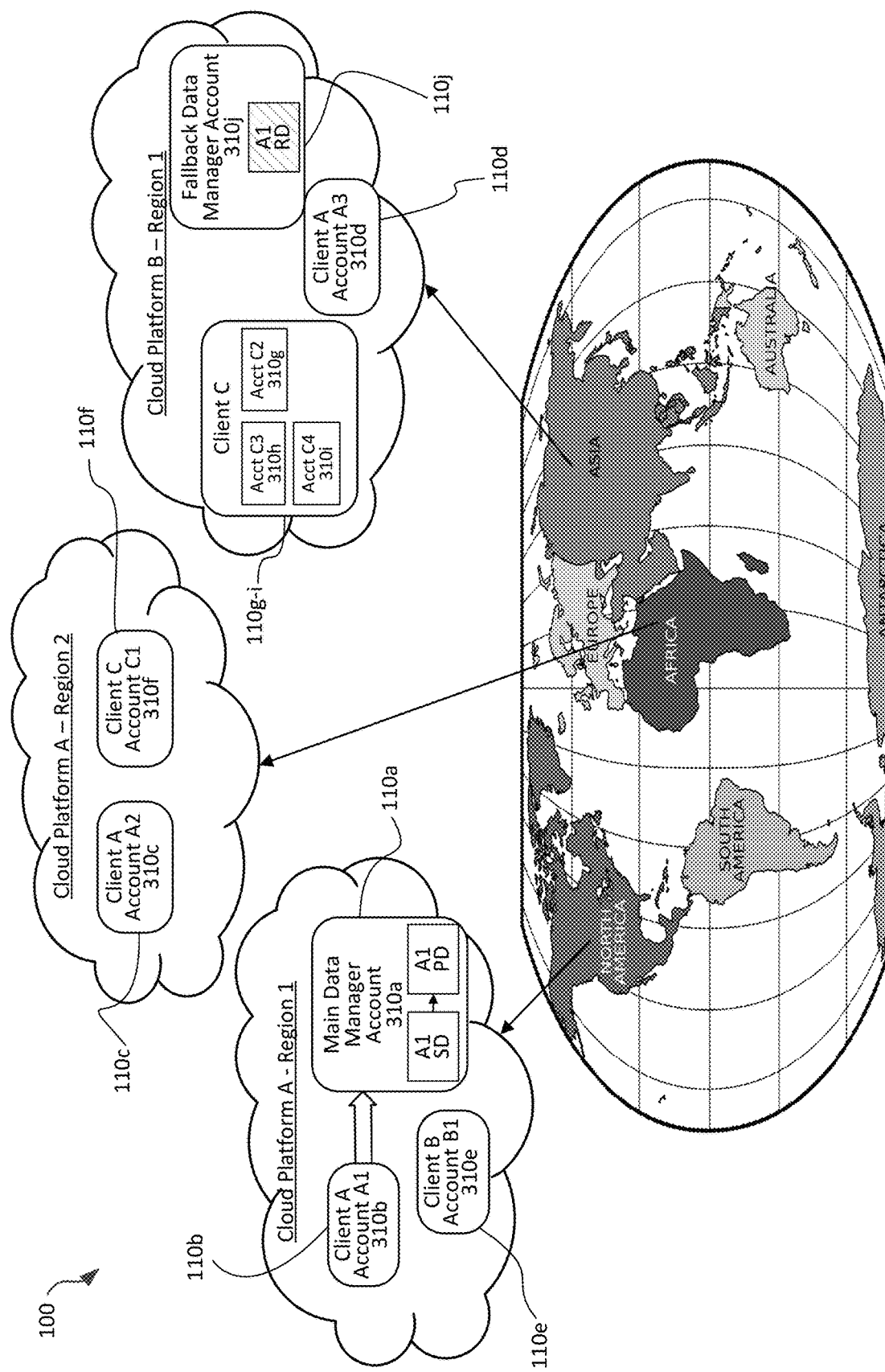
FIG. 6D illustrates an illustrative cloud-based data warehousing system during the data collection and sharing method described in FIG. 5.

By way of example, and referring to FIGS. 6A-6D, if the request was received to access data associated with Client A, then at step 504, Accounts A1 310b, A2 310c, and A3 310d may be identified as accounts associated with Client A, and data warehouses 110b, 110c, and 110d may be identified as associated with Accounts A1 310b, A2 310c, and A3 310d. It may further be determined that the data warehouse 110b associated with Account A1 310b is hosted on Region 1 of Cloud Platform A, as shown in FIG. 6A. Accordingly, at steps 506 and 508, it may be determined that Account A1 310b is hosted on the same cloud platform and the same cloud region as the main data manager account 310a, as shown in FIG. 6A. In this case, at step 510, instructions may be sent to a computing device associated with the data warehouse 110b for Account A1 310b to share data from one or more of its data warehouse objects with the main data manager account 310a. At step 512, Account A1 310b may share its data with the main data manager account 310a and the data warehouse 110a associated with the main data manager account 310a may receive a share of the data, as shown in FIG. 6B. At step 514, the main data manager account 310a may persist the data shared from Account A1 310b, as shown in FIG. 6C. At step 516, the persisted data may be replicated to the fallback data manager account 310j associated with data warehouse 110j hosted on Region 1 of Cloud Platform B, as shown in FIG. 6D. After replicating the data to the fallback data manager account 310j, the method may return to step 506 to process any additional identified accounts associated with Client A. In this example, Accounts A2 310c and A3 310d and corresponding data warehouses 110c and 110d were also identified at step 504.

Figure 6E:
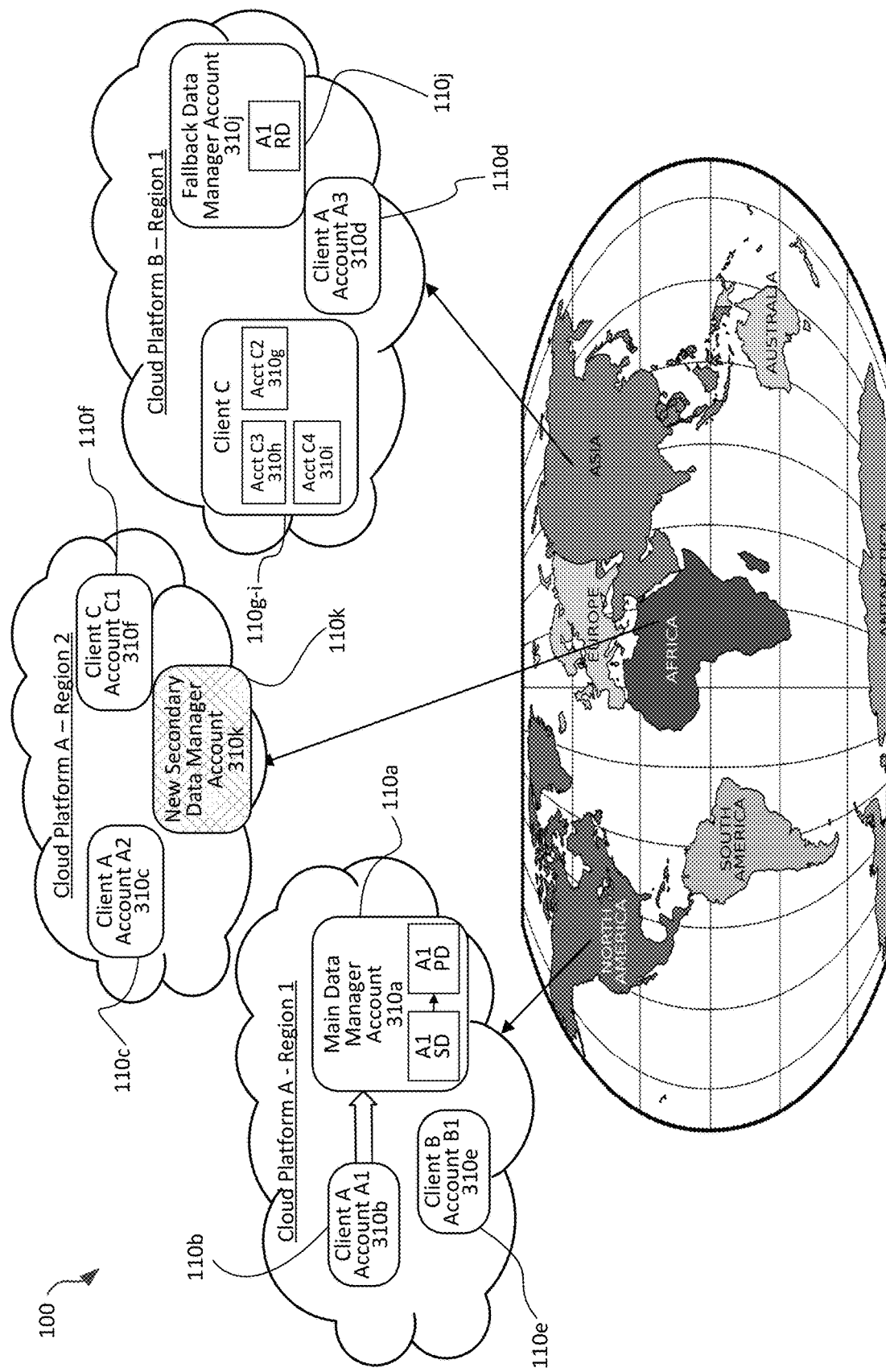
FIG. 6E illustrates an illustrative cloud-based data warehousing system during the data collection and sharing method described in FIG. 5.
Figure 6F:
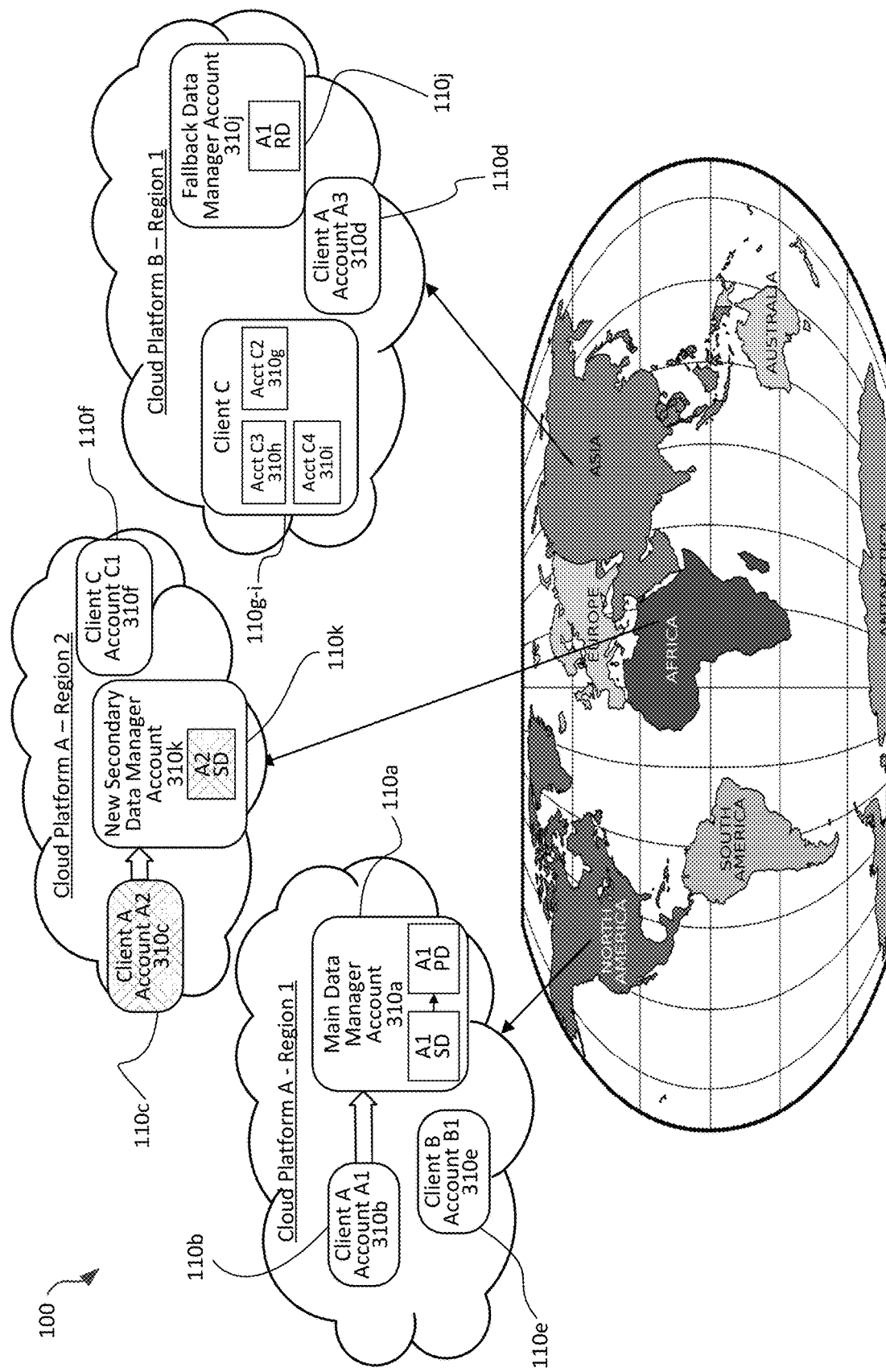
FIG. 6F illustrates an illustrative cloud-based data warehousing system during the data collection and sharing method described in FIG. 5.
Figure 6G:
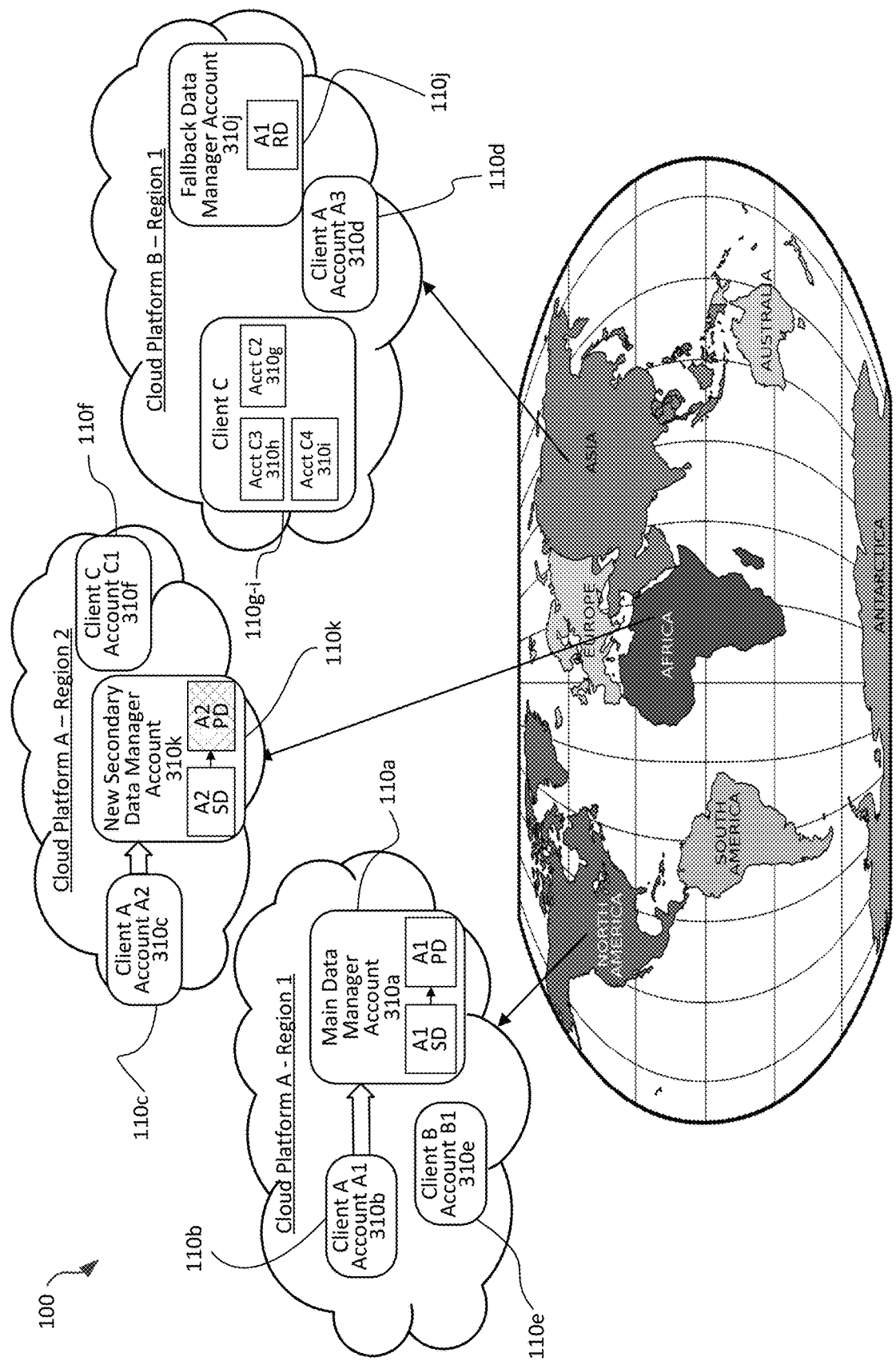
FIG. 6G illustrates an illustrative cloud-based data warehousing system during the data collection and sharing method described in FIG. 5.
Figure 6H:
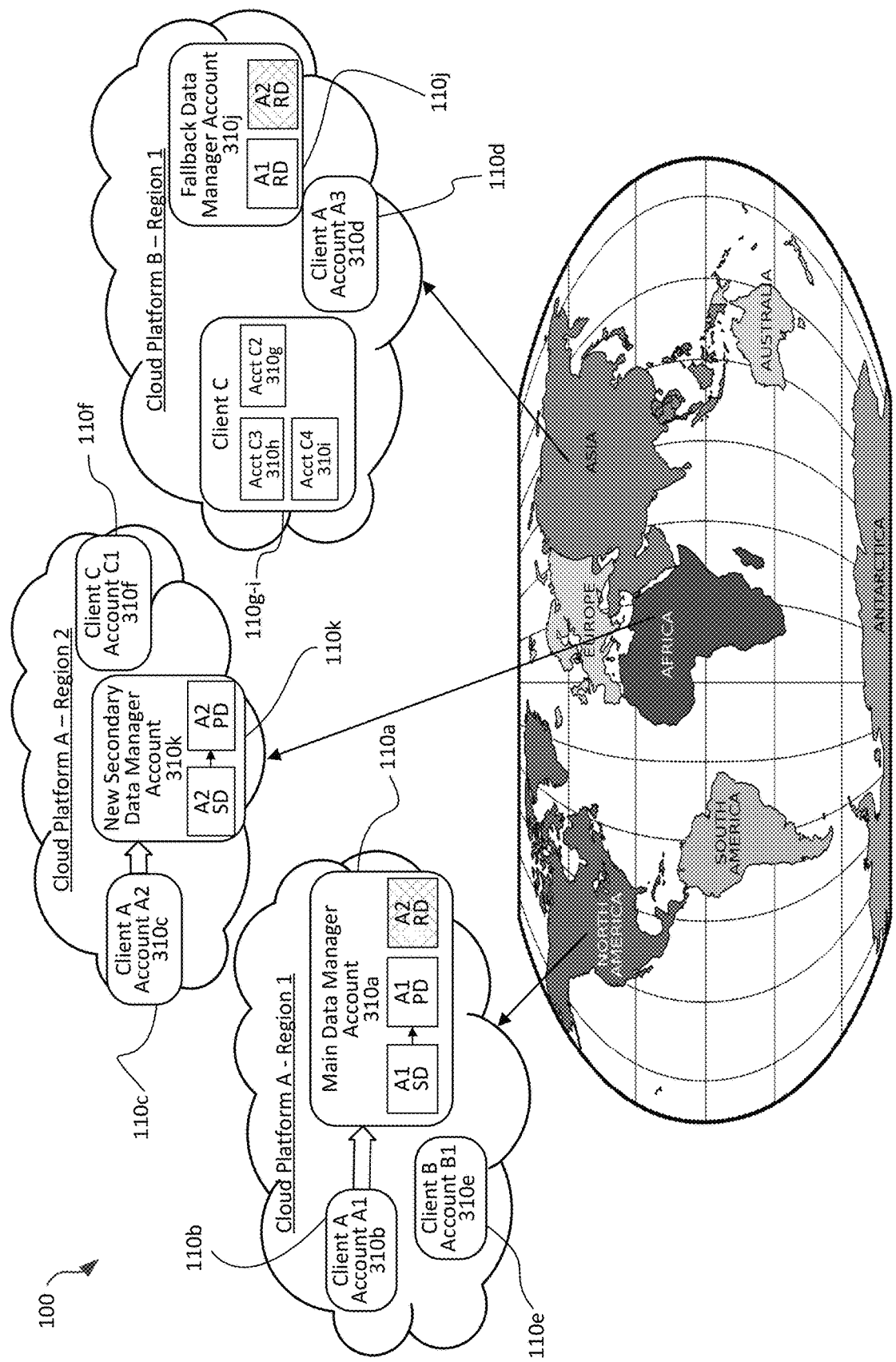
FIG. 6H illustrates an illustrative cloud-based data warehousing system during the data collection and sharing method described in FIG. 5.

Therefore, referring to FIGS. 6A and 6E-6L, it may be determined that the data warehouse 110c associated with Account A2 310c is hosted at Region 2 of Cloud Platform A, as shown in FIG. 6A. Accordingly, at steps 506 and 508, it may be determined that Account A2 310c is hosted on the same cloud platform as the main data manager account 310a, but in a different cloud region, as shown in FIG. 6A. Thereafter, at step 518, it may be determined that there is no secondary data manager account 310k hosted on this different cloud region, as shown in FIG. 6A. Accordingly, at step 520, a new secondary data manager account 310k may be created in Region 2 of Cloud Platform A, and a new data warehouse 110k may be instantiated, as shown in FIG. 6E. At step 524, Account A2 310c may share its data with the newly-created secondary data manager account 310k and the data warehouse 110k associated with the secondary data manager account 310k may receive a share of the data, as shown in FIG. 6F. At step 526, the data manager computing device 301 may send instructions to a computing device associated with the data warehouse 110k to persist the data shared from Account A2 310c, and the data may be persisted, as shown in FIG. 6G. At step 528, the persisted shared data from Account A2 310c may be replicated to the main data manager account 310a associated with data warehouse 110a, and may further be replicated to the fallback data manager account 310j associated with data warehouse 110j, as shown in FIG. 6H. After replicating the data to the main data manager account 310a and/or the fallback data manager account 310j, the method may return to step 508 to process any additional accounts associated with Client A (such as identified at step 504).

Figure 6I:
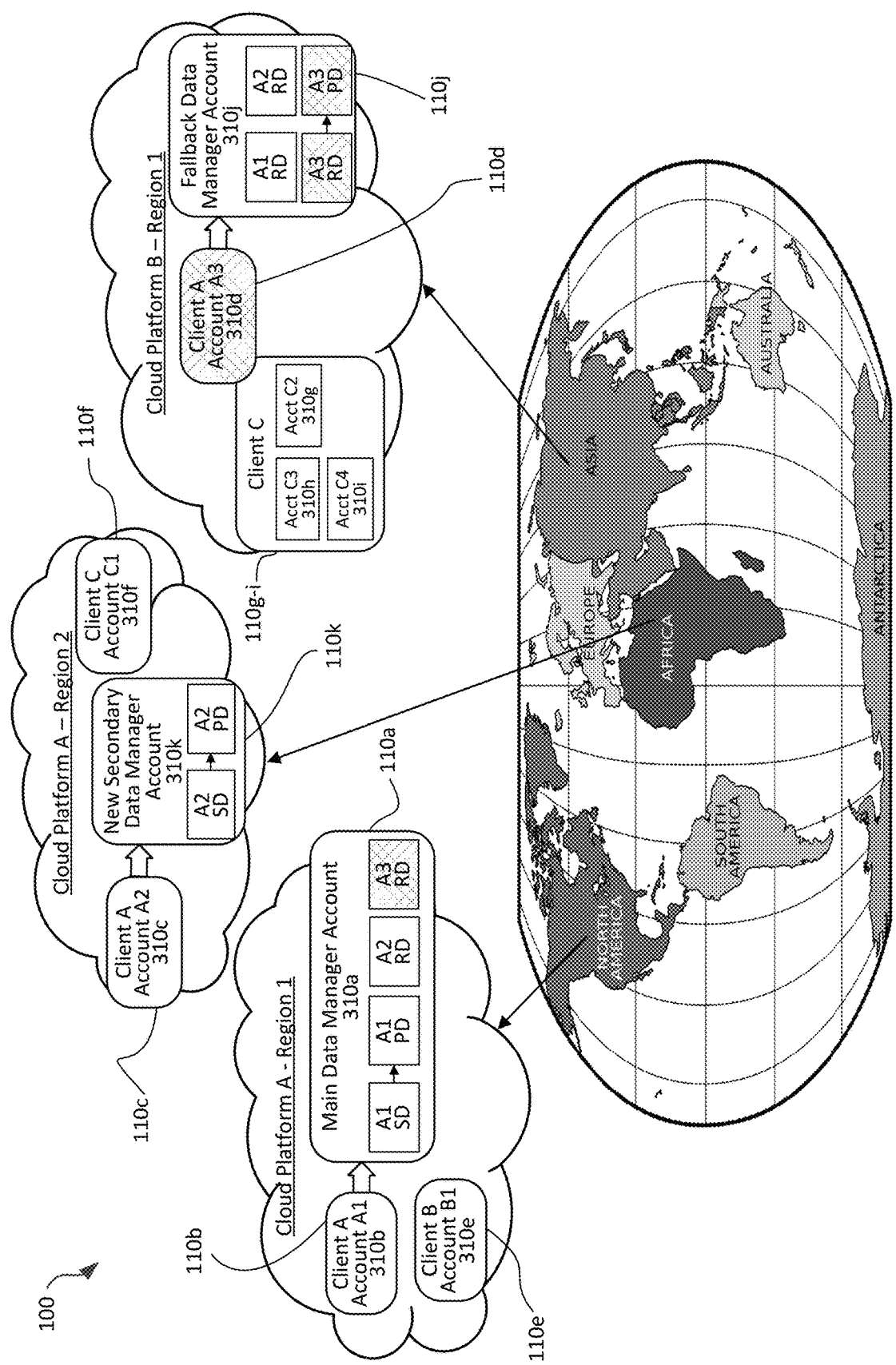
FIG. 6I illustrates an illustrative cloud-based data warehousing system during the data collection and sharing method described in FIG. 5.

Accordingly, a similar process may be followed to receive data shared from Account A3 310d to the main data manager account 310a (and the fallback data manager account 310j). For instance, referring again to FIGS. 6A and 6I, it may be determined that the data warehouse 110d associated with Account A3 310d is hosted at Region 1 of Cloud Platform B, as shown in FIG. 6A. Accordingly, at step 506, it may be determined that Account A3 310d is not hosted on a same cloud platform as the main data manager account 310a, as shown in FIG. 6A. Thereafter, at step 518, it may be determined that there is a secondary data manager account, e.g., the fallback data manager account 310j, hosted on the different cloud region, as shown in FIG. 6A. Accordingly, at step 522, instructions may be sent to a computing device associated with Account A3 310d instructing Account A3 310d to share its data with the fallback data manager account 310j, and the data warehouse 110j associated with the fallback data manager account 310j may receive a share of the data, as shown in FIG. 6I. At step 526, the data manager computing device 301 may send instructions to a computing device associated with the data warehouse 110j to persist the data shared from Account A3 310d, and the data may be persisted, as shown in FIG. 6I. At step 528, the persisted shared data from Account A3 310d may be replicated to the main data manager account 310a associated with data warehouse 110a, as shown in FIG. 6I. After replicating the data to the main data manager account 310a, the method may return to step 508 to process any additional accounts associated with Client A (such as identified at step 504). In this case, there may be no additional accounts associated with Client A and the method may end.

Figure 6J:
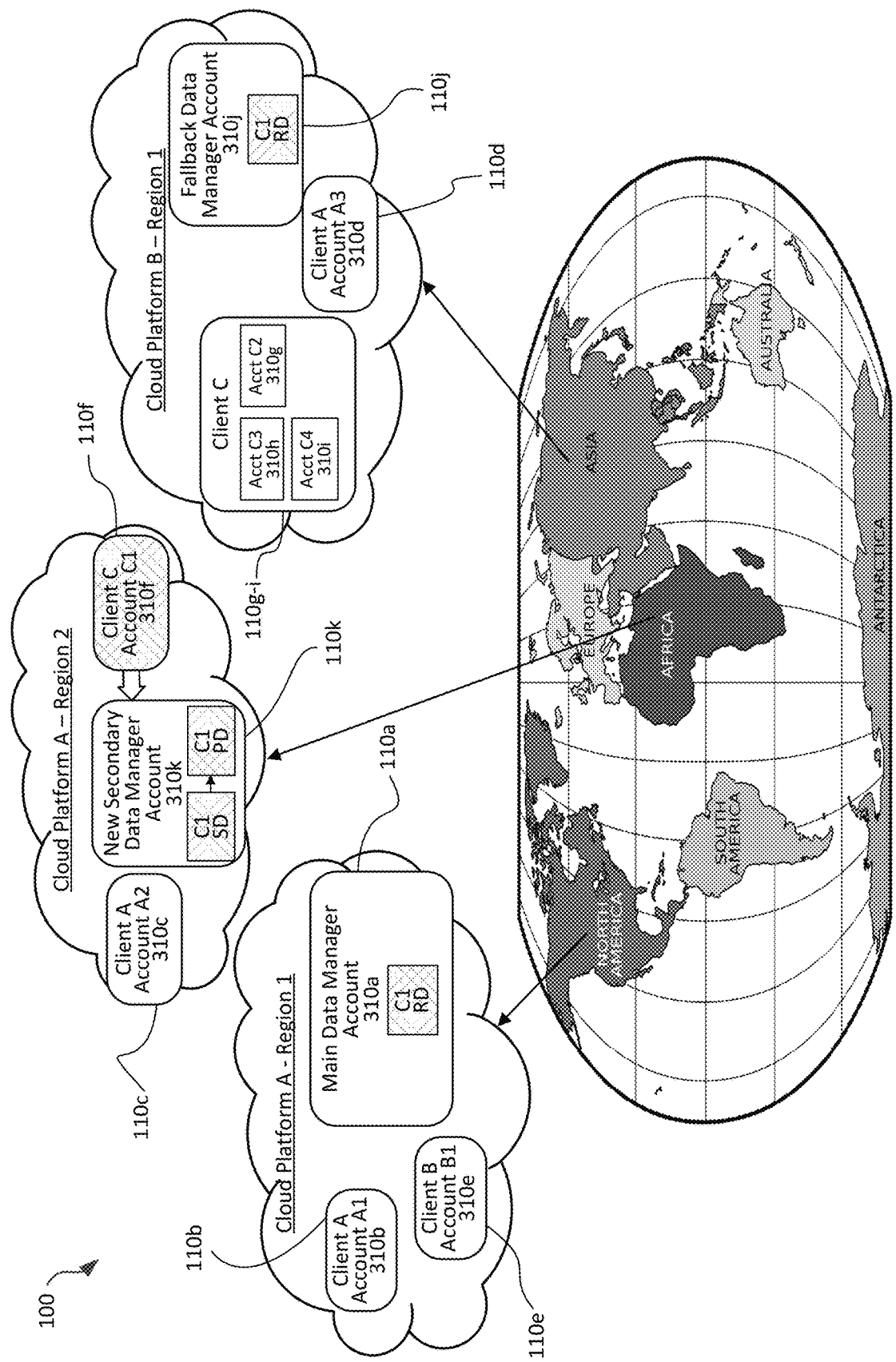
FIG. 6J illustrates an illustrative cloud-based data warehousing system during the data collection and sharing method described in FIG. 5.

As a further example, and referring to FIGS. 6A and 6J, if the request was to access data associated with Client C, then at step 504, Accounts C1 310f, C2 310g, C3 310h, and C4 310i may be identified as accounts associated with Client C, and data warehouses 110f, 110g, 110h, and 110i may be identified as the data warehouses associated with Accounts C1 310f, C2 310g, C3 310h, and C4 310i. It may be determined that the data warehouse 110f associated with Account C1 310f is hosted at Region 2 of Cloud Platform A, as shown in FIG. 6A. Accordingly, at steps 506 and 508, it may be determined that Account C1 310f is hosted on the same cloud platform as the main data manager account 310a, but in a different cloud region, as shown in FIG. 6A. Thereafter, at steps 518-528, the process may proceed in a similar manner as described above with respect to Account A2 310c, and the data from Account C1 310f may be shared with and persisted at the new secondary data manager account 310k and also replicated to the main data manager account 310a and the fallback data manager account 310j, as shown in FIG. 6J. After step 528, the method may return to step 508 to process any additional accounts associated with Client C (such as identified at step 504).

Figure 6K:
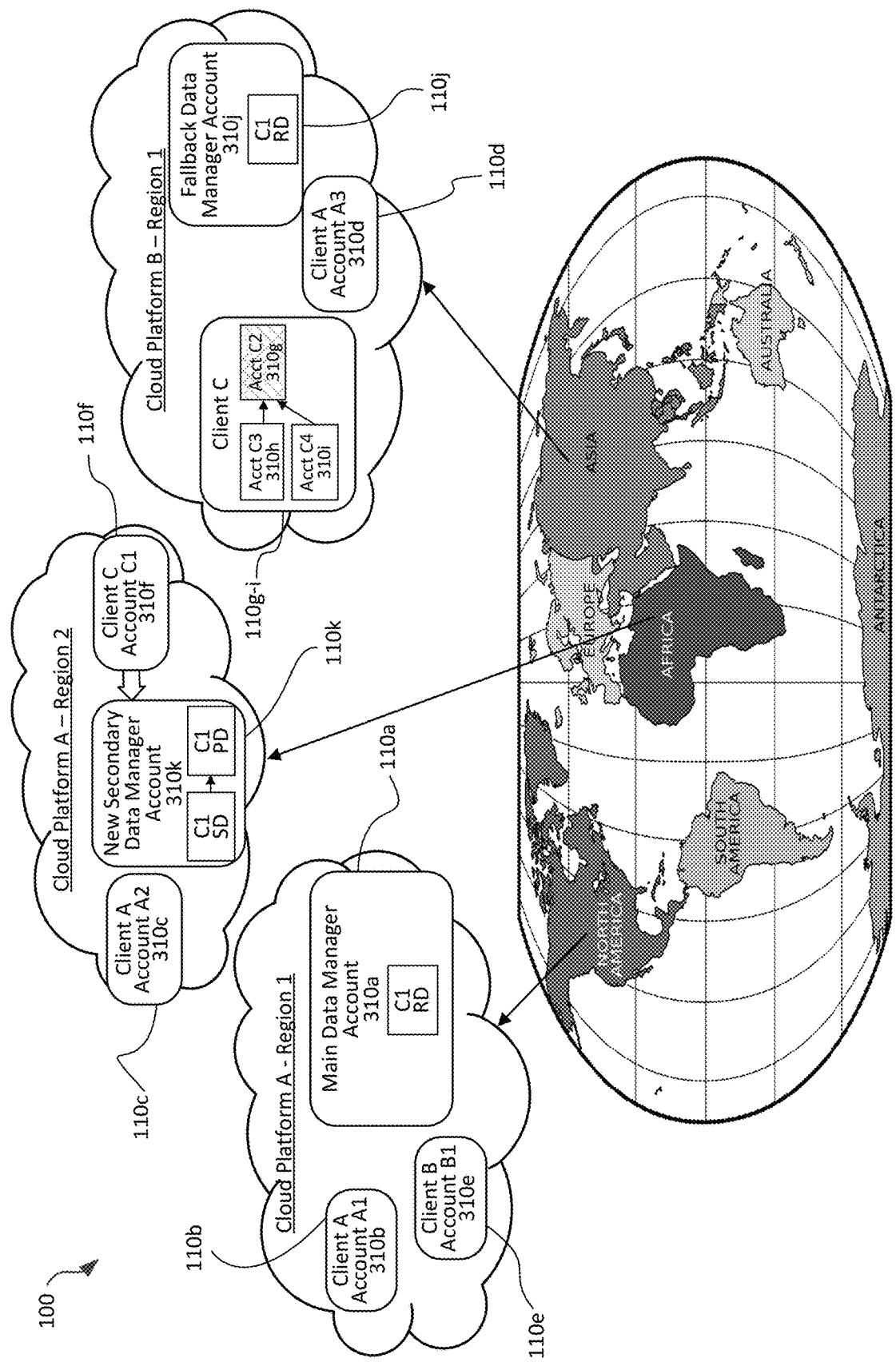
FIG. 6K illustrates an illustrative cloud-based data warehousing system during the data collection and sharing method described in FIG. 5.
Figure 6L:
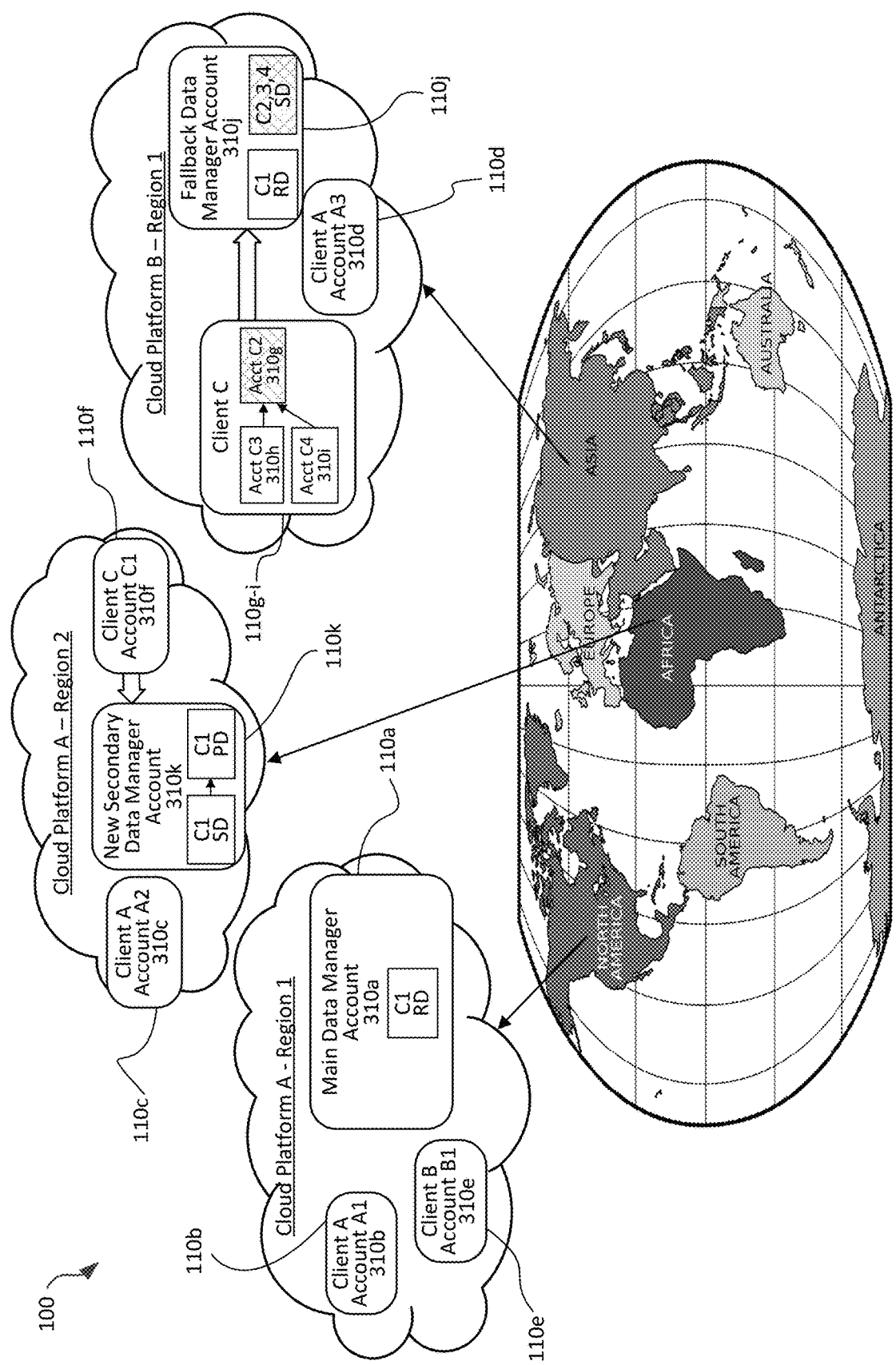
FIG. 6L illustrates an illustrative cloud-based data warehousing system during the data collection and sharing method described in FIG. 5.
Figure 6M:
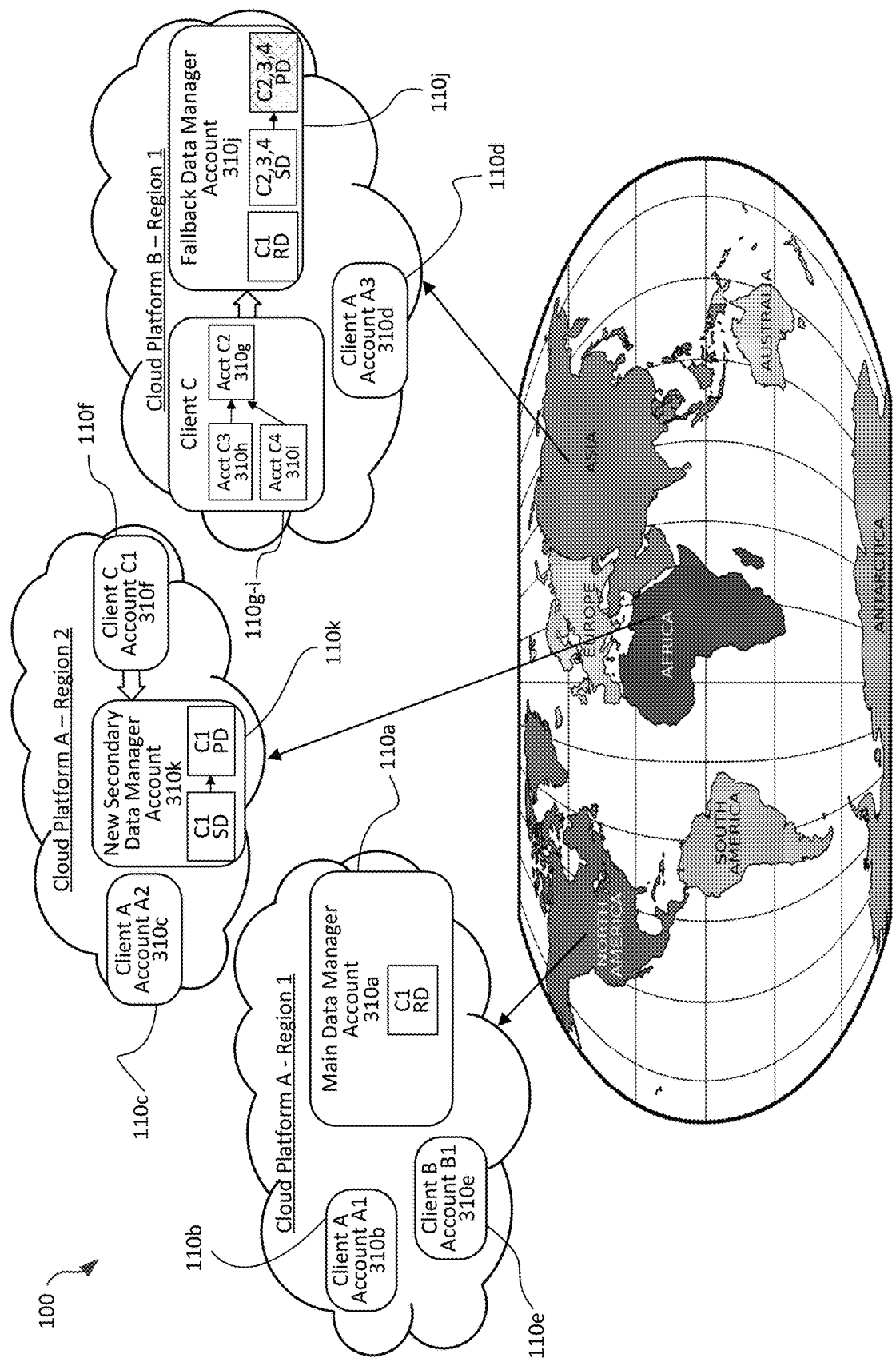
FIG. 6M illustrates an illustrative cloud-based data warehousing system during the data collection and sharing method described in FIG. 5.
Figure 6N:
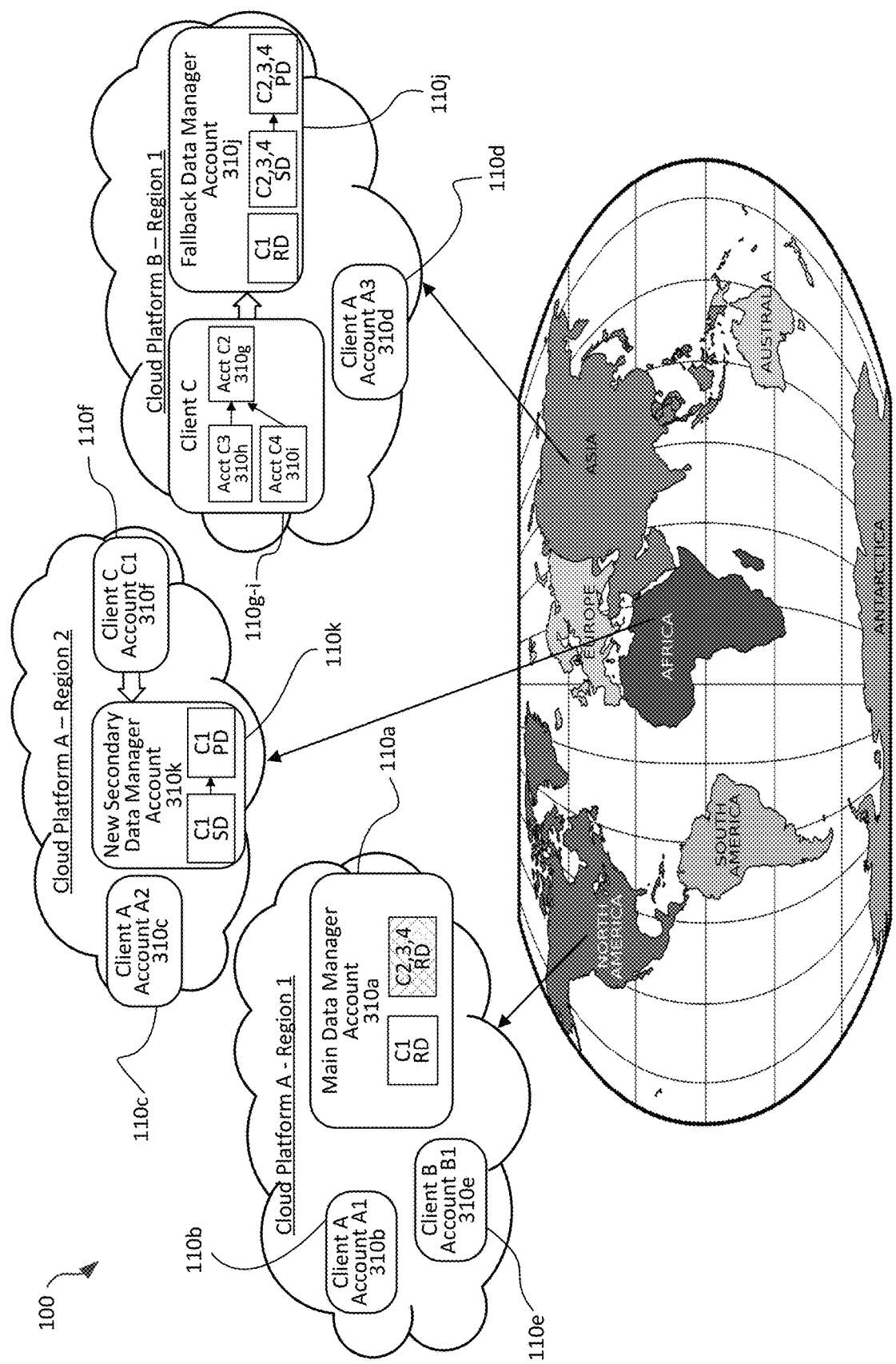
FIG. 6N illustrates an illustrative cloud-based data warehousing system during the data collection and sharing method described in FIG. 5.

Accordingly, Accounts C2 310g, C3 310h, and C4 310i may have additionally been identified as accounts associated with Client C, at step 504, as described above. At step 504, it may have further been determined that the data warehouses 110g-i associated with Account C2 310g, Account C3 310h, and Account C4 310i are hosted at Region 1 of Cloud Platform B. Accordingly, at step 506, it may be determined that Account C2 310g, Account C3 310h, and Account C4 310i are hosted on a different cloud platform from the main data manager account 310a, as shown in FIG. 6A. Thereafter at step 518, it may be determined that there already exists a secondary data manager account on Cloud Platform B, such as the fallback data manager account 310j hosted on data warehouse 110j, as shown in FIG. 6A. Accordingly, at step 522, instructions may be sent to one or more computing devices associated with data warehouses 110g-i hosting Account C2 310g, Account C3 310h, and Account C4 310i, for primary Account C2 310g to share its data with the fallback data manager account 310j hosted on data warehouse 110j. The instructions may cause secondary Account C3 310h and Account C4 310i to first share their data with primary Account C2 310g, before primary Account C2 310g shares its data, and the shared data from secondary Account C3 310h and Account C4 310i, with the fallback data manager account 310j, as shown in FIG. 6K. At step 524, primary Account C2 310g may share its data (and the data shared from secondary Account C3 310h and Account C4 310i) with the fallback data manager account 310j and the data warehouse 110j associated with the fallback data manager account 310j may receive a share of the data, as shown in FIG. 6L. At step 526, the data manager computing device 301 may send instructions to a computing device associated with the data warehouse 110*j*, to persist the data shared from Account C2 310*g*, Account C3 310*h*, and Account C4 310*i*, and the data may be persisted, as shown in FIG. 6M. At step 528, the persisted shared data from Account C2 310*g*, Account C3 310*h*, and Account C4 310*i* may be replicated to the main data manager account 310*a* associated with data warehouse 110*a*, and since the persisted data from Account C2 310*g*, Account C3 310*h*, and Account C4 310*i* already resides in the data warehouse 110*j* associated with the fallback data manager account 310*j*, it might not be necessary to replicate the data there, as shown in FIG. 6N. After replicating the data to the main data manager account 310*a*, the method may return to step 508 to process any additional accounts associated with Client C (such as identified at step 504). In this example, there are no additional accounts associated with Client C, therefore, the process may end.

Accordingly, the process described with respect to FIG. 5 and illustrated in FIGS. 6A-6N may enable accounts associated with different organizations, such as a main data manager account 310*a* associated with a cloud data management system 300 and one or more accounts associated with the clients of the cloud data management system 300 to seamlessly and efficiently share data across different cloud platforms and different cloud regions of a cloud-based data warehouse system, such as the cloud-based data warehousing system 110.

Aspects of this disclosure may additionally enable accounts associated with different organizations, such as the one or more accounts associated with the clients of the cloud data management system 300, to seamlessly and efficiently share data across different cloud platforms and different cloud regions of the cloud-based data warehousing system 110, through the use of one or more intermediary or orchestrating accounts. For instance, one or more data manager accounts associated with the cloud data management system 300 may facilitate or orchestrate the sharing of data between Client A's Account A1 310*b* and Client C's Account C1 310*f*, for example, when those accounts are hosted in the cloud-data warehousing system 110 on different cloud platforms or regions from one another.

Figure 7:
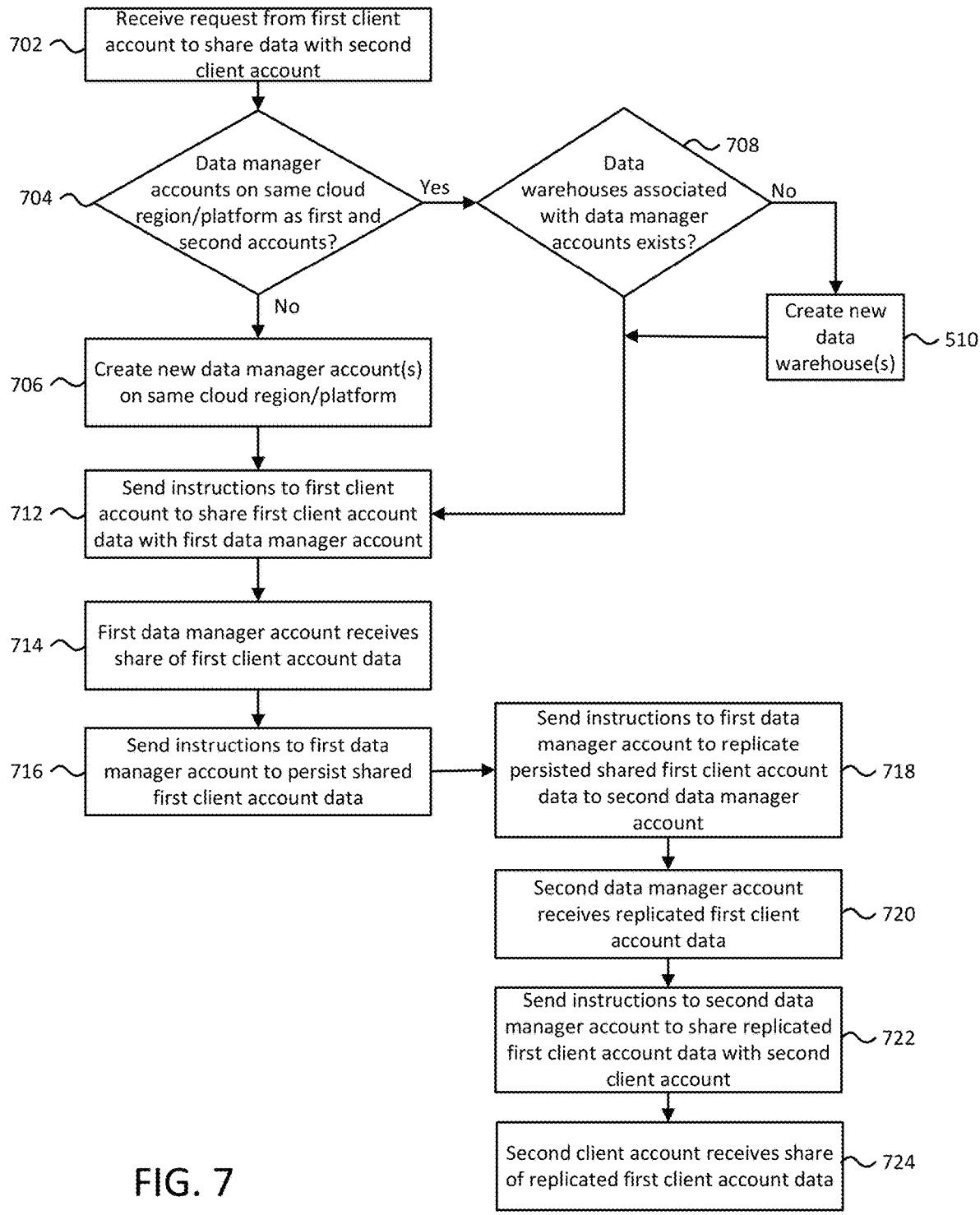
FIG. 7 shows an illustrative flowchart for performing a data sharing method, in accordance with one or more aspects described herein.
Figure 8:
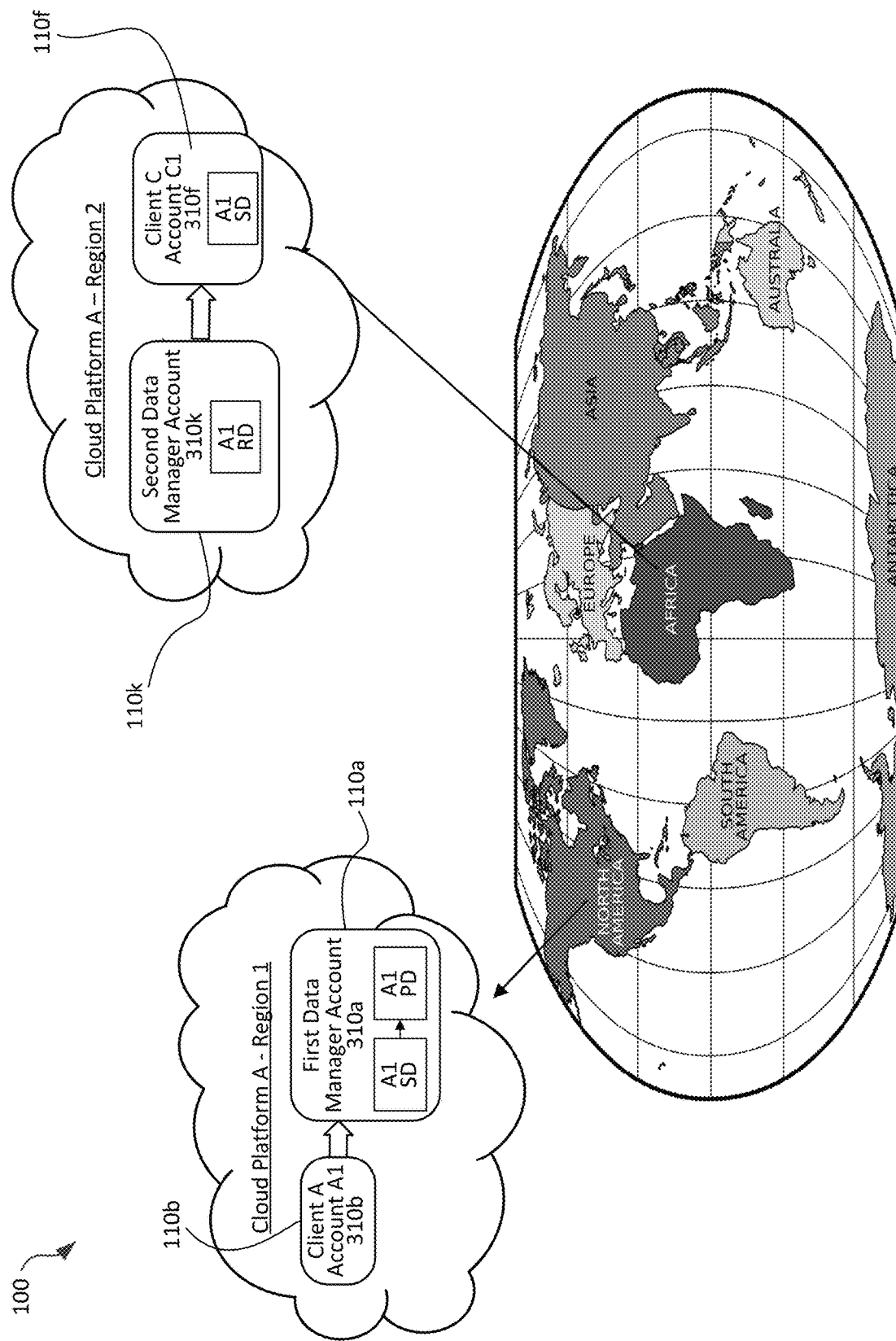
FIG. 8 illustrates an illustrative cloud-based data warehousing system during the data sharing method described in FIG. 7.

For example, referring to FIGS. 7 and 8, at step 702, a request may be received, by data manager computing device 301 associated with the cloud data management system 300. The request may be received from a first client account, such as Account A1 310*b* of Client A, to share data from its data warehouse 110*b* with a second client account, Account C1 310*f* of Client C. The first client account may make a request for the facilitation of such sharing when the first client account is hosted in the cloud-based data warehousing system 110 in a different cloud-region or cloud-platform from the second client account, also hosted in the cloud-based data warehousing system 110. For instance, in this example, Account A1 310*b* may be hosted in Region 1 of Cloud Platform A, while Account C1 310*f* may be hosted in Region 2 of Cloud Platform A. Facilitation of sharing in this case may be necessary as a result of technical limitations associated with the native features of the cloud-based data warehousing system 110, such as SNOWFLAKE, which may otherwise prohibit the sharing of data, within the cloud-based data warehousing system 110, to an account hosted on a different cloud platform or cloud region, or may prohibit the replication of data to an account when the accounts are associated with different organizations. The request may include information identifying the data to be shared, such as a table, a view, a database, a schema, a user defined function, a database, or any other type of data. The request may, additionally or alternatively, include information identifying an amount or size of the data to be shared, such as in number of bytes or number of rows.

At step 704, the data manager computing device 301 may determine whether a first data manager account is hosted on the same cloud region and platform as the first client account and whether a second data manager account is hosted on the same cloud region and platform as the second client account. The data manager accounts may be accounts maintained by the cloud data management system 300 for facilitating the sharing of data, within the cloud-based data warehousing system 110, between accounts of its client organizations. For instance, the data manager computing device 301 may store or access information indicating one or more data manager accounts associated with cloud data management system 300. The data manager computing device 301 may determine if any of those data manager accounts are hosted on the same cloud region and platform as the first client account and second client account. If a first data manager account does exist on the same cloud region and platform as the first client account and a second data manager account exists on the same cloud region and platform as the second client account, then the process may proceed to step 708. For instance, a first data manager account, such as the main data manager account 310*a*, may be identified as existing on the same cloud region and platform as the first client account, such as on Region 1 of Cloud Platform A. And a second data manager account, such as secondary data manager account 310*k*, may be identified as existing on the same cloud region or cloud platform as the second client account, such as on Region 2 of Cloud Platform A. Otherwise, if either the first or the second data manager accounts do not exist, then the process may proceed to step 706.

At step 706, if it was determined that either the first or the second data manager accounts do not exist on the same cloud region and platform as the first client account or the second client account, respectively, then, the data manager computing device 301 may cause a new data manager account to be created on that cloud platform or cloud region (e.g., if no data manager account exists on the same cloud region and platform as the first client account one will be created there, and if no data manager account exists on the same cloud region and platform as the second client account, one will be created there). Creating such accounts may be necessary as a result of technical limitations associated with the native features of the cloud-based data warehousing system 110, such as SNOWFLAKE, which may otherwise prohibit the sharing of data, within the cloud-based data warehousing system 110, to an account hosted on a different cloud platform or cloud region, or may prohibit the replication of data to an account associated with a different organization. Accordingly, to facilitate the sharing and/or replication of data in such cases, a new data manager account may be created, on-demand, on the same cloud region and platform as the first client account or the second client account. The data manager computing device 301 may execute a script that may cause the new data manager account to be created and configured on the cloud region and platform where the first client account or second client is hosted. Creating and configuring the new data manager account may further involve the instantiation and configuration of a new virtual data warehouse 110*k* to be associated with the new data manager account. The script may include configuration information indicating computing resources that should be associated with the new data warehouse 110*k*, for example, a quantity of memory, a processor speed, a number of nodes and/or clusters, a size of the warehouse, or the like. The configuration information may further indicate a duration of time for which the new data warehouse 110k should be available—such as an hour, a day, a week, indefinitely, etc. Additionally or alternatively, the configuration may be based on information included in the request, such as information indicating an amount of data to be shared. As part of the configuration of the new virtual data warehouse 110k, the script may further cause the creation of one or more databases, schemas, and/or database objects, in the new data warehouse 110k, for receiving the shared data.

If it was determined that data manager accounts already exist on the same cloud region and platform as each of the first client account and the second client account (at step 704), then, at step 708, the data manager computing device 301 may further determine whether each of the data manager accounts have access to a data warehouse 110a-n for receiving the shared data. For instance, the information accessed at step 704 may further indicate, for each of the data manager accounts, corresponding data warehouses 110a-n associated with those data manager accounts.

If either of the data manager accounts do not have access to a data warehouse 110a-n, the process may proceed to step 710, to create a new virtual warehouse 110k to be associated with that data manager account. The new virtual warehouse 110k may be created and configured as described above in step 504. In some instances, a data warehouse 110k may be associated with the data manager account, but might not be properly configured for the particular data request. For instance, the size of the data warehouse may be too small or too large, and may need to be altered, one or more operating parameters associated with computing resources associated with the data warehouse may need to be altered or adjusted, or the like. In this case, the existing data warehouse may be reconfigured based on the information provided in the request.

At step 712, after it is determined that the first and second data manager accounts and corresponding data warehouses 110a-n exist, were newly created (e.g., the data warehouse 110k), or reconfigured, then the data manager computing device 301 may send, to a computing device associated with the first client account, instructions that may be configured to cause the first client account to share the data with the first data manager account 310a. Sharing may involve the first client account granting permission for the first data manager account 310a to access the specified data in the data warehouse 110b associated with the first client account. Such sharing may be accomplished without copying or transferring any actual data between accounts. For example, the sharing may be enabled via the architecture of the cloud-based data warehousing system 110, such as through the use of metadata.

At step 714, in response to the instructions to share the first client account's data with the first data manager account 310a, the data warehouse 110a, associated with the first data manager account 310a, may receive a share of the data associated with the first client account. In this case, the first client account (e.g., the sharing or source account) may create a share of one or more of their data warehouse objects (e.g., maintained in the data warehouse 110b) comprising the data to be shared, such as schemas, databases, tables, views, stored procedures, functions, etc. and may grant permission to the first data manager account 310a to access the data warehouse objects. Receiving the share may involve the automatic creation, in the data warehouse 110a associated with the first data manager account 310a, of a read-only database created from the share. Once created, all of the shared data warehouse objects may be accessible from the first data manager account 310a.

At step 716, the data manager computing device 301 may send, to a computing device associated with the first data manager account 310a, instructions configured to cause the first data manager account 310a to persist, such as cache or store, the shared data in the data warehouse 110a associated with the first data manager account 310a. The data may be persisted permanently or temporarily. For instance, the persisted data may be stored in a database table of the data warehouse 110a associated with the first data manager account 310a. Persisting the data in this manner may be important because native functionality of the cloud-based data warehousing system 110, such as SNOWFLAKE, may prohibit the sharing of data to an account hosted on a different cloud region and/or cloud platform and may further prohibit the replication of a share. The cloud data management system 300, however, may need to copy or otherwise transmit the shared data to another data manager account maintained by the cloud data management system 300, such as to the second data manager account 310k on the same cloud region and platform as the second client account, which is the ultimate target account for receiving the shared data.

At step 718, the data manager computing device 301 may send, to the computing device associated with the first data manager account 310a, additional instructions configured to cause the persisted shared data to be replicated to the data warehouse 110k associated with the second data manager account 310k hosted on the same cloud region and platform as the second client account, for instance on the Region 2 of the Cloud Platform A. The instructions may further be configured to cause the data warehouse 110a associated with the first data manager account 310a to be dropped or suspended after the shared data is replicated to the second data manager account 310k, to conserve compute resources. The instructions may cause the data warehouse 110a to be dropped or suspended after a predetermined period of time, such as after an hour, or a day, etc., of replicating the data to the second data manager account 310k.

At step 720, in response to the instructions to replicate the first client account's data to the second data manager account 310k, the data warehouse 110k, associated with the second data manager account 310k, may receive a replicated copy of the data. Accordingly, because a replicated copy of the data from the first client account—hosted on a different cloud region and platform from the second client account— is now on the same cloud region and platform as the second client account, the data may be shared with the second client account.

At step 722, the data manager computing device 301 may send, to the computing device associated with the second data manager account 310k, instructions configured to cause the second data manager account 310k to, upon receiving the replicated data, share the replicated data with the second client account. The instructions may further be configured to cause the data warehouse 110k associated with the second data manager account 310k to be dropped or suspended after the data is shared to the second client account, to conserve compute resources. The instructions may cause the data warehouse 110k to be dropped or suspended after a predetermined period of time, such as after an hour, or a day, etc., of sharing the data to the second client account.

At step 724, in response to the instructions to share the replicated data with the second client account, the data warehouse 110f associated with the second client account may receive a share of the replicated data associated with the first client account. In this case, the second data manager account 310*k* (e.g., the sharing or source account) may create a share of one or more of their data warehouse objects (e.g., maintained in the data warehouse 110*k*) comprising the data to be shared, such as schemas, databases, tables, views, stored procedures, functions, etc. and may grant permission to the second client account to access the data warehouse objects. Receiving the share may involve the automatic creation, in the data warehouse 110*f*, associated with the second client account, of a read-only database created from the share. Once created, all of the shared data warehouse objects may be accessible from the second client account.

Figure 9A:
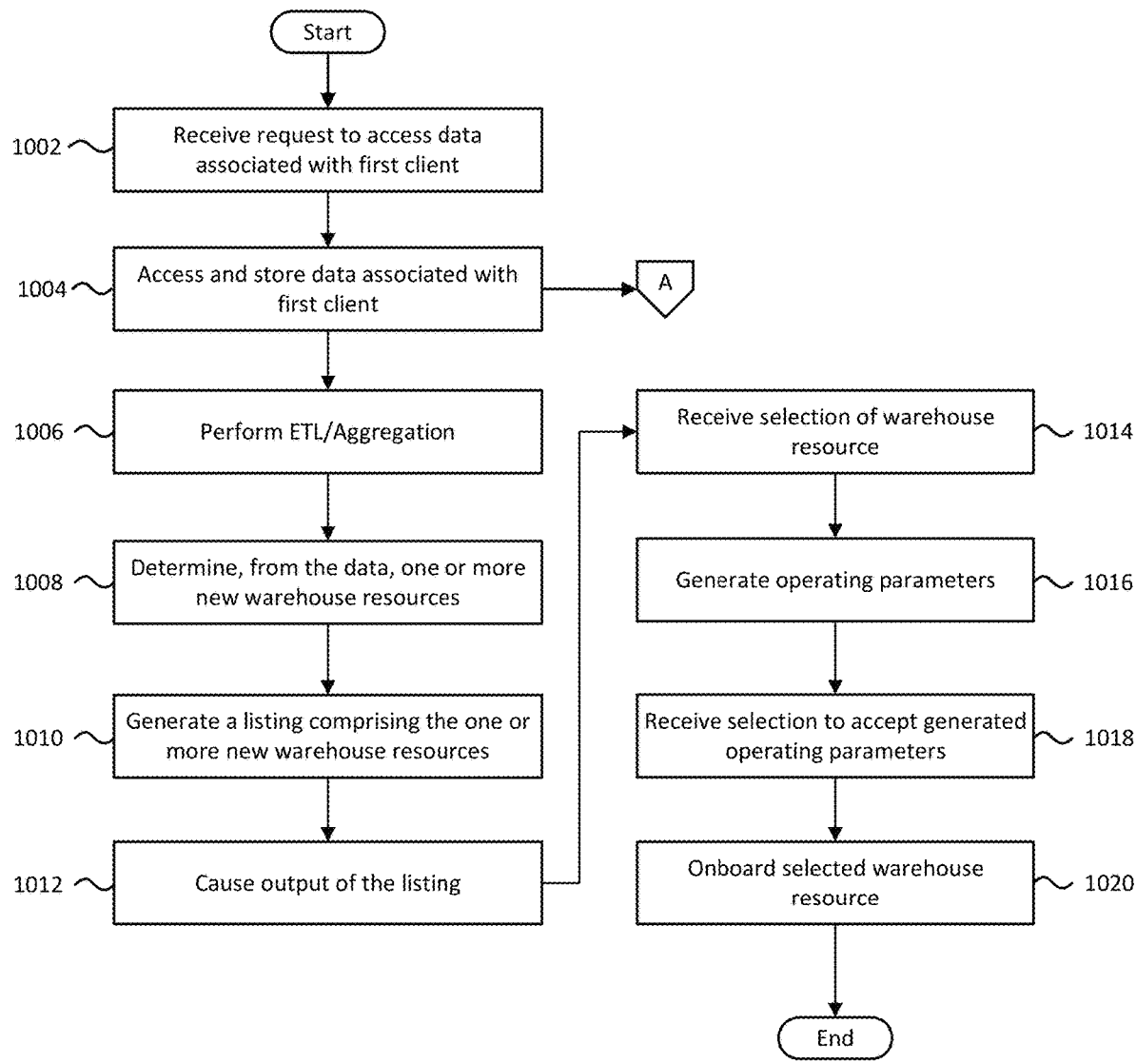
FIG. 9A shows an illustrative flowchart for performing a method of onboarding unmanaged data warehouse resources, in accordance with one or more aspects described herein.
Figure 9B:
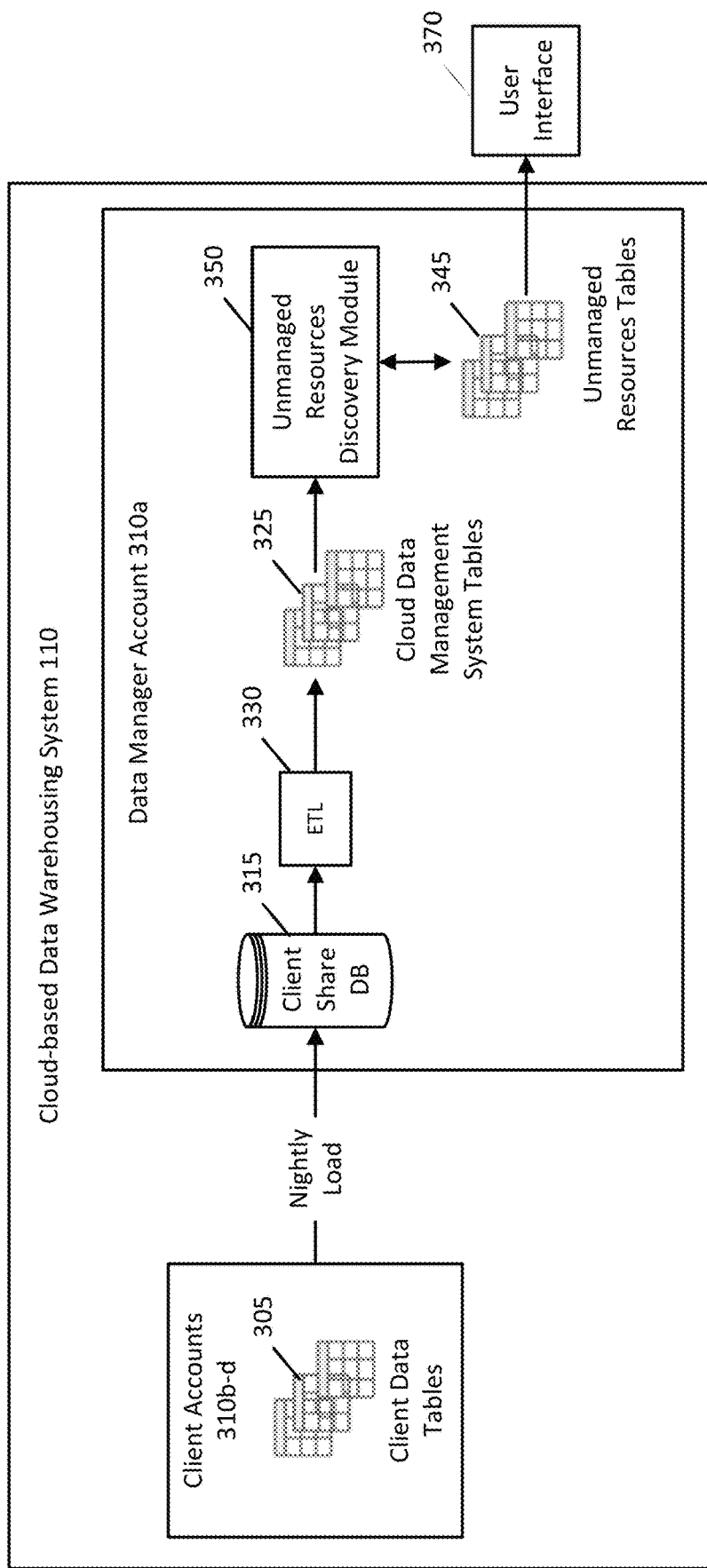
FIG. 9B illustrates an illustrative data flow related to the process described in FIG. 9A, in accordance with one or more aspects described herein.

FIG. 9A shows an exemplary flowchart for performing a method of onboarding unmanaged data warehouse resources. FIG. 9B illustrates an exemplary data flow related to the process described in FIG. 9A. FIG. 9C shows an illustrative user interface displaying a listing of unmanaged resources. The cloud-based warehousing system 110 may provide a method to automatically incorporate or onboard unmanaged data warehouses or warehouse resources into the cloud data management system 300.

In some cases, the client may have one or more unmanaged warehouse resources. The unmanaged data resources) may be those that were created outside the cloud data management system 300. For example, those created before the client onboards their accounts and/or corresponding warehouse resources to the cloud data management system 300 or those created outside the cloud data management system 300 after the client has already onboarded other accounts and/or warehouse resources. (e.g., when a client creates new warehouse resources without registering, linking, and/or importing those warehouse resources to the cloud data management system 300). In such situations, the cloud data management system 300 might not be able to manage the unmanaged warehouse resources unless the unmanaged warehouse resources are registered, linked, imported, etc. to the cloud data management system 300. In order to allow the client to utilize the cloud data management system 300 to effectively manage its warehouse resources, and to reduce the burden of manually linking each of the unmanaged warehouse resources to the cloud data management system 300, systems and methods provided herein may automatically discover (e.g., identify) unmanaged warehouse resources, and register, link, or import the discovered warehouse resources into the cloud data management system 300.

Referring to FIG. 9A, some or all of the steps may be performed by one or more computing devices associated with cloud data management system 300 and/or the cloud-based data warehousing system 110. For convenience, the steps in FIG. 9A are described from the perspective of a data manager computing device 301. The data manager computing device 301 may be associated with the data manager account 310*a* of the cloud data management system 300.

At step 1002, the data manager computing device 301 may receive a request to access data associated with a first client hosted by the cloud-based data warehousing system 110. The request may be received, via an application or user interface, such as user interface 370, associated with the cloud data management system 300, from a user, such as a system administrator, associated with the first client. For instance, the user may request to execute a process to discover unmanaged warehouse resources in the cloud-based data warehousing system 110 that are associated with the first client. In some cases, the process to discover the unmanaged warehouse resources may be scheduled to automatically execute on a periodic basis, such as daily, weekly, hourly, etc.

As an example, the request may be to access data warehouse resource data associated with Client A. The data may be associated with one or more client accounts 310*a-d* associated with Client A (such as Account A1 310*b*, Account A2 310*c*, and Account A3 310*d*) and hosted by the cloud-based data warehousing system 110. The data may be data maintained by the first client in one or more cloud data warehouses 110*b-n* in the client warehousing system 110. For instance, the data may be stored in one or more client data tables 305 associated with the client accounts 310*b-d* and hosted by the cloud-based data warehousing system 110, such as shown in FIG. 9B. The data may be associated with one or more warehouse resources associated with the first client's cloud data warehouses 110*b-n*.

For example, the warehouse resources may comprise one or more of: a data warehouse, a database, a schema, a table, a column, a view, a stored procedure, a function, a user, a role, a stage, a policy, or any other data warehouse object. In some cases, the data may be associated with usage of the resources over a specified period of time, such as the past day, week, month, a custom time range, since a last execution time, etc. In some cases, the data may indicate costs associated with usage of the resources for the specified period of time. In some cases, the data may indicate one or more operating parameters of the resources, such as a quantity of memory, a processor speed, a number of nodes and/or clusters, a size, an on/off state, or the like.

At step 1004, the data manager computing device 301 may access the data associated with the first client. Accessing the data may involve accessing data from multiple accounts associated with the first client and hosted on different cloud regions or cloud platforms of the cloud-based data warehousing system 110. For instance, the data may be accessed in accordance with the process described with respect to FIG. 5. Once the data is accessed, the data manager computing device 301 may store the accessed data in one or more tables or views associated with the data manager account 310*a*. For instance, the data may be stored in the client share database 315, such as shown in FIG. 9B. Upon storing the data, the data manager computing device 301 may further insert a record into a client share load status table, in the client share database 315, indicating that the data has been loaded and is accessible.

At step 1006, the data manager computing device 301 may execute one or more ETL or aggregation functions 330, such as via the ETL/aggregation module 330, to load the data into the tables and/or views in a uniform form and structure. The tables and/or views may be stored in one or more databases in the cloud data warehouse 110*a* associated with the data manager account 310*a* and may be usable by one or more processes for discovering unmanaged resources. For instance, the data may be stored in one or more of the cloud data management system tables 325, such as shown in FIG. 9B.

At step 1008, the data manager computing device 301 may determine, from the data, one or more new unmanaged warehouse resources since a previous request to discover unmanaged resources. The one or more new unmanaged warehouse resources may be new warehouse resources that are associated with one or more of the first client's accounts. For instance, these may be warehouse resources that were created outside of the cloud data management system 300 after the previous request to discover unmanaged resources.

At step 1010, the data manager computing device 301 may generate a listing comprising the one or more new unmanaged warehouse resources associated with the first client. For example, the listing may be maintained or stored in one or more unmanaged resources tables, such as shown in FIG. 9B.

At step 1012, the data manager computing device 301 may cause output of the listing of the one or more new unmanaged warehouse resources associated with the first client. For example, the listing may be output to an application or user interface, such as user interface 370 shown in FIG. 9C, associated with the cloud data management system 300. The listing may comprise a warehouse resource name, a size associated with the warehouse resource, a cost associated with operating the warehouse resource, an estimated savings associated with operating the warehouse resource based on recommended operating parameters, or any other information associated with the warehouse resource. The warehouse resources in the listing may be grouped by a type associated with each of the one or more new warehouse resources. For example, the warehouse resources may be grouped into data warehouses, databases, stored procedures, tables, etc. In some cases, the listing may be sent to a user associated with the first client, such as a system administrator, for approval of management of one or more of the resources by the cloud data management system 300.

At step 1014, the data manager computing device 301 may receive a selection of a warehouse resource from the listing. For example, a user may select, via the user interface 370, a particular warehouse resource from the listing that is to be onboarded to the cloud data management system 300.

At step 1016, the data manager computing device 301 may generate a set of operating parameters to be associated with the selected warehouse resource. For example, if the selected warehouse resource is a data warehouse, the operating parameters may comprise one or more of: a size of the data warehouse, a minimum number of clusters associated with the data warehouse, a maximum number of clusters associated with the data warehouse, a scaling policy associated with the data warehouse, an automatic suspension indication, and/or an on/off state. The particular operating parameter values may be determined based on the data received at step 1002. For instance, the data may indicate usage patterns, query processing times, or the like associated with the selected data resource, and the parameter values may be determined based on an analysis of the data. In some cases, the data manager computing device 301 may generate, based on the selected warehouse resource being a data warehouse, a default schedule for operating the data warehouse. The default schedule may set different operating parameters for the data warehouse for one or more periods of time. For example, based on detecting from the data, a pattern of usages spikes at a particular time of day, the operating parameters values for the minimum and/or maximum number of clusters for that particular time of day might be greater than for other times of the day. As another example, the data may reveal that larger, more computing resource-intensive queries are run at the end of the month, resulting in query processing times greater than a threshold amount of time. In this case, a size of the data warehouse may be scheduled to increase to a larger size at the end of the month, and return to a previous size at the beginning of the month. In some cases, the data manager computing device 301 may generate a set of operating parameters by causing execution of the recommendation process described with respect to FIG. 4A. In this case, the recommendation engine 360 may output the recommended operating parameters for the selected data warehouse. In some cases, the generated operating parameters may also indicate how frequently data should be collected from the client for the selected resource for monitoring usage and costs. The generated operating parameters may further comprise parameters that may be used to generate recommendation configuration information to be associated with the selected resource. As discussed above, the recommendation configuration information may identify one or more recommendation algorithms that should be executed for generating insights, recommendations, alerts, notifications, or the like related to a particular warehouse resource. The recommendation configuration information may further indicate a frequency for executing the recommendation algorithms for the particular warehouse resource.

At step 1018, the first data manager computing device 301 may receive a selection to accept one or more of the generated set of operating parameters for the selected warehouse resource. In some cases, the user may modify, delete, or otherwise selectively accept one or more of the generated set of operating parameters.

At step 1020, in response to accepting one or more of the generated set of operating parameters for the selected warehouse resource, the first data manager computing device 301 may cause the selected warehouse resource to be onboarded to the cloud data management system 300, such as by registering or linking the resource with the cloud data management system 300. In this case, information identifying the onboarded resource may be stored in one or more tables associated with cloud data management system 300. In some cases, the data associated with the onboarded resource may be imported into the cloud data management system 300 and further stored in one or more associated tables. Upon onboarding the resource, data associated with that resource may be deleted from the unmanaged resources tables 345, so as to indicate that the resource is no longer unmanaged.

Once onboarded, the data manager computing device 301 may be operated or scheduled to operate in accordance with the accepted generated operating parameters. Further, recommendations and insights may be scheduled to be generated in accordance with the defined recommendation configuration information. Additionally, the data manager computing device 301 may monitor computing resource usage associated with the onboarded warehouse resource, in accordance with the generated operating parameters. For example, the computing resource usage may comprise the usage of one or more of: processors, memory, communication bandwidth, or the like. The data manager computing device 301 may monitor the computing resource usage continuously, during a period of time (e.g., predetermined by the administrator of the system), or during a time when the overall computing resource usage is high. The data manager computing device 301 may perform the monitoring by routinely collecting data from the client, such as described with respect to FIG. 3A.

The data manager computing device 301 may also perform additional operations on the selected warehouse resources. For example, the data manager computing device 310 may receive a selection indicating a stakeholder, such as a business unit or department, of the client's organization that is to be associated with the selected warehouse resource, the data manager computing device 301 may associate, in a database, the selected warehouse resource with the indicated stakeholder. In another example, the data manager computing device 301 may analyze the collected data to determine one or more recommended adjustments to operating parameters associated with one or more of the unmanaged resources, and may cause output, via the user interface 370, of the recommended adjustments. Further, upon selection of one or more of the recommended adjustments, the operating parameters of the corresponding unmanaged resource may be adjusted accordingly.

Accordingly, a first computing device, such as the data manger computing device 301, associated with a data manager account of a cloud-based data warehouse system may identify a plurality of client accounts associated with a first client of the cloud-based data warehouse system. The first computing device may determine that the plurality of client accounts associated with the first client are hosted in a plurality of different cloud regions of the cloud-based data warehouse system. For each client account of the plurality of client accounts associated with the first client, the first computing device, may: (1) on a periodic basis, send to a second computing device associated with the client account a first request; based on determining that the client account is hosted in a same cloud region as the data manager account, the first request may comprise a request for the client account to share, with the data manager account, data indicating warehouse resources associated with the client account; and based on determining that the client account is hosted in a different cloud region from the data manager account, the first request may comprise a request for the client account to share, with a second data manager account hosted in the different cloud region, the data indicating the warehouse resources associated with the client account; (2) based on determining that the client account is hosted in the different cloud region, send to a third computing device associated with the second data manager account, a second request to replicate, to the data manager account, the data shared from the client account; (3) receive an indication that the data is available for access; (4) access the data via the data manager account; and (5) store the accessed data in a database associated with the data manager account. Based on the stored data, the first computing device may determine one or more new warehouse resources included in the data since a previous request to access the data. The first computing device may output a listing comprising the one or more new warehouse resources from one or more of the plurality of accounts associated with the first client. The first computing device may receive a first selection of a warehouse resource from the listing comprising the one or more new warehouse resources. The first computing device may generate, in response to the first selection and based on a type of the selected warehouse resource, a set of operating parameters to be associated with the selected warehouse resource. The first computing device may configure the selected warehouse resource to utilize, during operation, the set of operating parameters.

The first computing device may update information indicating managed resources to indicate the selected warehouse resource.

The warehouse resources may include one or more of: a data warehouse, a database, a schema, a table, a column, a view, a stored procedure, a function, a user, a role, a stage, or a policy.

The first computing device may receive a second selection of a warehouse resource from the listing comprising the one or more new warehouse resources. Based on determining that the selected warehouse resource is a data warehouse, the first computing device may generate a default schedule for operating the data warehouse; and may configure the data warehouse to operate in accordance with the generated default schedule.

The default schedule may set operating parameters for the data warehouse for one or more periods of time.

The first computing device may analyze the data to determine one or more recommended adjustments to operating parameters associated with one or more of the one or more new warehouses resources and may cause output of the recommended adjustments. Based on receiving a second selection of a first recommended adjustment, of the recommended adjustments, the first computing device may adjust one or more operating parameters associated with a corresponding new warehouse resource in accordance with the first recommended adjustment.

The first computing device may receive a second selection of a warehouse resource from the listing comprising the one or more new warehouses. The first computing device may monitor, during a period of time, computing resource usage associated with the selected warehouse resource. Based on detecting that the computing resource usage exceeds a threshold, the first computing device may send a notification.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product. Although the present disclosure has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present disclosure may be practiced otherwise than specifically described without departing from the scope and spirit of the present disclosure. Thus, embodiments of the present disclosure should be considered in all respects as illustrative and not restrictive. Accordingly, the scope of the disclosure should be determined not by the embodiments illustrated, but by the appended claims and their equivalents. The following sets of numbered paragraphs comprise exemplary claims consistent with the methods, devices, and systems described herein. These claims do not present an exhaustive list of disclosures in this document, and do not necessarily delineate between separate embodiments in the disclosure. In some instances, the claims may overlap in scope, and may describe overlapping or interoperable disclosure.

What is claimed is:

1. A method comprising:

receiving, by a first computing device associated with a first data manager account hosted in a first cloud region of a cloud-based data warehouse system, a request to collect data from one or more client accounts associated with a first client and hosted by the cloud-based data warehouse system;

sending, by the first computing device and to a second computing device associated with a first client account, from the one or more client accounts associated with the first client, first instructions for the second computing device to share, with a second data manager account hosted in a second cloud region of the cloud-based data warehouse system, data from the first client account;

sending, by the first computing device and to a third computing device associated with the second data manager account, second instructions for the third computing device to replicate the shared data to the first data manager account, upon receiving an indication that the shared data is accessible;

receiving, by the first computing device, an indication that the shared data has been replicated;

storing, by the first computing device, based on the indication that the shared data has been replicated, the shared data in a database associated with the first data manager account;

causing an analysis of the stored shared data to determine one or more new data warehouse resources since a previous request to collect the data;

retrieving, by the first computing device, configuration information associated with a plurality of recommendation algorithms associated with the first client, wherein the configuration information indicates an execution frequency for each of the plurality of recommendation algorithms;

retrieving, by the first computing device, information indicating a last execution date for each of the plurality of recommendation algorithms;

determining, by the first computing device and based on the configuration information, the execution frequency of each of the plurality of recommendation algorithms, and the last execution date for each of the plurality of recommendation algorithms, that a first recommendation algorithm of the plurality of recommendation algorithms is scheduled for execution;

causing, by the first computing device and using the stored shared data, execution of the first recommendation algorithm;

receiving, by the first computing device and based on the execution of the first recommendation algorithm, at least one recommendation associated with a first data warehouse associated with the first client, wherein the at least one recommendation comprising a recommendation of a set of operating parameters to be associated with the one or more new data warehouse resources; and outputting, by the first computing device, the at least one recommendation.

2. The method of claim 1, wherein the second instructions further comprise instructions for the third computing device to:

create a second data warehouse comprising at least one database for receiving the shared data; and drop the second data warehouse after replicating the shared data to the first data manager account.

3. The method of claim 1, wherein causing execution of the first recommendation algorithm comprises:

causing an analysis of the stored shared data to determine one or more load metrics associated with usage of the first data warehouse during a period of time; and generating, based on the one or more load metrics, a recommended schedule for operating the first data warehouse with different operating parameters for different periods of time, and wherein receiving the at least one recommendation comprises receiving the recommended schedule for operating the first data warehouse.

4. The method of claim 1, wherein causing execution of the first recommendation algorithm comprises:

determining, based on the configuration information, one or more dependencies associated with the first recommendation algorithm, wherein the one or more dependencies comprise one or more second recommendation algorithms;

determining, based on the configuration information, a sequence of execution of the one or more second recommendation algorithms; and causing, prior to execution of the first recommendation algorithm, in the determined sequence, and using the stored shared data, execution of the one or more second recommendation algorithms.

5. The method of claim 1, wherein the stored shared data comprises information associated with computing resource usage of the first data warehouse during a period of time, and wherein execution of the first recommendation algorithm comprises analyzing the information associated with the computing resource usage of the first data warehouse during the period of time to generate the at least one recommendation.

6. The method of claim 1, further comprising:

causing, based on receiving the at least one recommendation, one or more of:

modification of one or more operating parameters associated with operating the first data warehouse, setting of a schedule for operating the first data warehouse, or modification of a size of the first data warehouse.

7. The method of claim 1, further comprising:

determining, based on the configuration information, a second recommendation algorithm;

causing, using the stored shared data, execution of the second recommendation algorithm, wherein the second recommendation algorithm is configured to:

analyze the stored shared data to determine a metric associated with usage of a first computing resource associated with the first data warehouse; and based on the metric, determine that usage of the first computing resource exceeds a threshold; and transmitting, based on the execution of the second recommendation algorithm and to a user device, a notification indicating a usage spike associated with the first computing resource.

8. A first computing device associated with a first data manager account hosted in a first cloud region of a cloud-based data warehouse system, wherein the first computing device comprises:

one or more processors; and memory storing instructions that, when executed by the one or more processors, cause the first computing device to:

receive a request to collect data from one or more client accounts associated with a first client and hosted by the cloud-based data warehouse system;

send, to a second computing device associated with a first client account, from the one or more client accounts associated with the first client, first instructions to share, with a second data manager account hosted in a second cloud region of the cloud-based data warehouse system, data from the first client account;

send, to a third computing device associated with the second data manager account, second instructions to replicate the shared data to the first data manager account, upon receipt of an indication that the shared data is accessible;

receive an indication that the shared data has been replicated;

store, based on the indication that the shared data has been replicated, the shared data in a database associated with the first data manager account;

cause an analysis of the stored shared data to determine one or more new data warehouse resources since a previous request to collect the data;

retrieve configuration information associated with a plurality of recommendation algorithms associated with the first client, wherein the configuration information indicates an execution frequency for each of the plurality of recommendation algorithms;

retrieve information indicating a last execution date for each of the plurality of recommendation algorithms;

determine, based on the configuration information, the execution frequency of each of the plurality of recommendation algorithms, and the last execution date for each of the plurality of recommendation algorithms, that a first recommendation algorithm of the plurality of recommendation algorithms is scheduled for execution;

cause, using the stored shared data, execution of the first recommendation algorithm;

receive, based on the execution of the first recommendation algorithm, at least one recommendation associated with a first data warehouse associated with the first client, wherein the at least one recommendation comprises a recommendation of a set of operating parameters to be associated with the one or more new data warehouse resources; and output the at least one recommendation.

9. The first computing device of claim 8, wherein the second instructions further comprise instructions for the third computing device to:

create a second data warehouse comprising at least one database for receiving the shared data; and drop the second data warehouse after replicating the shared data to the first data manager account.

10. The first computing device of claim 8, wherein the instructions, when executed by the one or more processors, cause the execution of the first recommendation algorithm by causing the first computing device to:

cause an analysis of the stored shared data to determine one or more load metrics associated with usage of the first data warehouse during a period of time; and generate, based on the one or more load metrics, a recommended schedule for operating the first data warehouse with different operating parameters for different periods of time, and wherein the instructions, when executed by the one or more processors, cause the receipt of the at least one recommendation by causing the first computing device to receive the recommended schedule for operating the first data warehouse.

11. The first computing device of claim 8, wherein the instructions, when executed by the one or more processors, cause the execution of the first recommendation algorithm by causing the first computing device to:

determine, based on the configuration information, one or more dependencies associated with the first recommendation algorithm, wherein the one or more dependencies comprise one or more second recommendation algorithms;

determine, based on the configuration information, a sequence of execution of the one or more second recommendation algorithms; and cause, prior to execution of the first recommendation algorithm, in the determined sequence, and using the stored shared data, execution of the one or more second recommendation algorithms.

12. The first computing device of claim 8, wherein the stored shared data comprises information associated with computing resource usage of the first data warehouse during a period of time, and wherein the instructions, when executed by the one or more processors, cause the execution of the first recommendation algorithm by causing the first computing device to analyze the information associated with the computing resource usage of the first data warehouse during the period of time to generate the at least one recommendation.

13. The first computing device of claim 8, wherein the instructions, when executed by the one or more processors, further cause the first computing device to:

cause, based on receipt of the at least one recommendation, one or more of:
modification of one or more operating parameters associated with operating the first data warehouse,
setting of a schedule for operating the first data warehouse, or
modification of a size of the first data warehouse.

14. The first computing device of claim 8, wherein the instructions, when executed by the one or more processors, further cause the first computing device:

determine, based on the configuration information, a second recommendation algorithm;

cause, using the stored shared data, execution of the second recommendation algorithm, wherein the second recommendation algorithm is configured to:
analyze the stored shared data to determine a metric associated with usage of a first computing resource associated with the first data warehouse; and
based on the metric, determine that usage of the first computing resource exceeds a threshold; and transmit, based on the execution of the second recommendation algorithm and to a user device, a notification indicating a usage spike associated with the first computing resource.

15. A cloud data management system comprising:

a first computing device associated with a first data manager account hosted in a first cloud region of a cloud-based data warehouse system;

a second computing device associated with a first client account, from one or more client accounts associated with a first client;

a third computing device associated with a second data manager account;

wherein the first computing device comprises:
one or more processors; and
memory storing instructions that, when executed by the one or more processors, cause the first computing device to:
receive a request to collect data from the one or more client accounts associated with the first client and hosted by the cloud-based data warehouse system;
send, to the second computing device, first instructions for the second computing device to share, with the second data manager account hosted in a second cloud region of the cloud-based data warehouse system, data from the first client account;
send, to the third computing device, second instructions for the third computing device to replicate the shared data to the first data manager account, upon receipt of an indication that the shared data is accessible;
receive an indication that the shared data has been replicated;
store, based on the indication that the shared data has been replicated, the shared data in a database associated with the first data manager account;
cause an analysis of the stored shared data to determine one or more new data warehouse resources since a previous request to collect the data;
retrieve configuration information associated with a plurality of recommendation algorithms associated with the first client, wherein the configuration information indicates an execution frequency for each of the plurality of recommendation algorithms;
retrieve information indicating a last execution date for each of the plurality of recommendation algorithms;
determine, based on the configuration information, the execution frequency of each of the plurality of recommendation algorithms, and the last execution date for each of the plurality of recommendation algorithms, that a first recommendation algorithm of the plurality of recommendation algorithms is scheduled for execution;
cause, using the stored shared data, execution of the first recommendation algorithm;
receive, based on the execution of the first recommendation algorithm, at least one recommendation associated with a first data warehouse associated with the first client, wherein the at least one recommendation comprises a recommendation of a set of operating parameters to be associated with the one or more new data warehouse resources; and
output the at least one recommendation.

16. The cloud data management system of claim 15, wherein the second instructions further comprise instruction for the third computing device to:

create a second data warehouse comprising at least one database for receiving the shared data; and
drop the second data warehouse after replicating the shared data to the first data manager account.

17. The cloud data management system of claim 15, wherein the instructions, when executed by the one or more processors, further cause the first computing device to:
cause an analysis of the stored shared data to determine one or more load metrics associated with usage of the first data warehouse during a period of time; and
generate, based on the one or more load metrics, a recommended schedule for operating the first data warehouse with different operating parameters for different periods of time, and
wherein the first computing device is configured to receive the at least one recommendation by causing the first computing device to receive the recommended schedule for operating the first data warehouse.

18. The cloud data management system of claim 15, wherein the stored shared data comprises information associated with computing resource usage of the first data warehouse during a period of time, and
wherein the first computing device is configured to cause the execution of the first recommendation algorithm by causing the first computing device to analyze the information associated with the computing resource usage of the first data warehouse during the period of time to generate the at least one recommendation.

19. The cloud data management system of claim 15, wherein the instructions, when executed by the one or more processors, further cause the first computing device to:
cause, based on receipt of the at least one recommendation, one or more of:
modification of one or more operating parameters associated with operating the first data warehouse,
setting of a schedule for operating the first data warehouse, or
modification of a size of the first data warehouse.

20. The cloud data management system of claim 15, wherein the instructions, when executed by the one or more processors, further cause the first computing device to:
determine, based on the configuration information, a second recommendation algorithm;
cause, using the stored shared data, execution of the second recommendation algorithm, wherein the second recommendation algorithm is configured to:
analyze the stored shared data to determine a metric associated with usage of a first computing resource associated with the first data warehouse; and
based on the metric, determine that usage of the first computing resource exceeds a threshold; and
transmit based on the execution of the second recommendation algorithm and to a user device, a notification indicating a usage spike associated with the first computing resource.

* * * * *